(12) United States Patent
Sumerlin et al.

(10) Patent No.: US 10,814,605 B2
(45) Date of Patent: Oct. 27, 2020

(54) CROSSLINKABLE OR FUNCTIONALIZABLE POLYMERS FOR 3D PRINTING OF SOFT MATERIALS

(71) Applicant: University of Florida Research Foundation, Inc., Gainesville, FL (US)

(72) Inventors: Brent S. Sumerlin, Gainesville, FL (US); Gregory Wallace Sawyer, Gainesville, FL (US); Thomas Ettor Angelini, Gainesville, FL (US); Christopher P. Kabb, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 86 days.

(21) Appl. No.: 15/995,849

(22) Filed: Jun. 1, 2018

(65) Prior Publication Data

US 2018/0273743 A1 Sep. 27, 2018

Related U.S. Application Data

(63) Continuation of application No. PCT/US2016/064771, filed on Dec. 2, 2016.
(Continued)

(51) Int. Cl.
*C08L 33/24* (2006.01)
*B33Y 10/00* (2015.01)
(Continued)

(52) U.S. Cl.
CPC .............. *B33Y 10/00* (2014.12); *B33Y 70/00* (2014.12); *C08F 2/38* (2013.01); *C08F 120/54* (2013.01);
(Continued)

(58) Field of Classification Search
CPC ....... B29C 64/106; B29C 64/10; B29C 64/00; C08L 33/24
See application file for complete search history.

(56) References Cited

U.S. PATENT DOCUMENTS

| 2,340,110 A | 1/1944 | D Alelio |
| 2,340,111 A | 1/1944 | D'Alelio et al. |

(Continued)

FOREIGN PATENT DOCUMENTS

| CA | 2822487 | 7/2012 |
| CN | 1450953 | 10/2003 |

(Continued)

OTHER PUBLICATIONS

Liu, Polymer Chemistry, 2012, vol. 3, p. 504-513 (Year: 2012).*
(Continued)

*Primary Examiner* — Robert C Boyle
(74) *Attorney, Agent, or Firm* — Thomas|Horstemeyer LLP

(57) ABSTRACT

Described herein are embodiments of compositions and methods relating to three-dimensional (3D) printing. Some embodiments are directed to a composition comprising a polymer with one or more dormant functional groups. According to some embodiments, the polymer may be formed through a controlled radical polymerization method. Some embodiments are directed to a composition comprising a polymer with one or more pendent crosslinkable groups. In some cases, the composition may be used as an "ink" for 3D printing. For example, the composition may be injected into a medium. The composition and/or medium may, in some embodiments, further comprise an initiator and/or a crosslinker. After injection of the composition into the medium, the one or more dormant functional groups and/or one or more pendent crosslinkable groups may be activated, and the polymer may be crosslinked. In certain (Continued)

cases, the crosslinked polymer may be removed from the medium to produce a freestanding three-dimensional structure.

59 Claims, 11 Drawing Sheets

Related U.S. Application Data

(60) Provisional application No. 62/263,524, filed on Dec. 4, 2015.

(51) Int. Cl.

| C08F 120/54 | (2006.01) |
|---|---|
| C08F 2/38 | (2006.01) |
| B33Y 70/00 | (2020.01) |
| C08L 25/06 | (2006.01) |
| B29C 64/118 | (2017.01) |
| C08F 12/08 | (2006.01) |
| C08F 20/18 | (2006.01) |
| C08F 20/56 | (2006.01) |

(52) U.S. Cl.
CPC .............. *C08L 25/06* (2013.01); *C08L 33/24* (2013.01); *B29C 64/118* (2017.08); *C08F 12/08* (2013.01); *C08F 20/18* (2013.01); *C08F 20/56* (2013.01); *C08F 2438/03* (2013.01); *C08F 2500/02* (2013.01); *C08F 2500/17* (2013.01); *C08F 2810/20* (2013.01); *C08L 2205/03* (2013.01)

(56) References Cited

U.S. PATENT DOCUMENTS

| 2,533,635 | A | 12/1950 | Seymour et al. |
| 3,940,351 | A | 2/1976 | Schlatzer, Jr. |
| 4,062,817 | A | 12/1977 | Westerman |
| 4,631,557 | A | 12/1986 | Cooke et al. |
| 5,034,486 | A | 7/1991 | Tzai et al. |
| 5,034,487 | A | 7/1991 | Tazi et al. |
| 5,034,488 | A | 7/1991 | Tazi et al. |
| 5,073,491 | A | 12/1991 | Familletti |
| 5,078,994 | A | 1/1992 | Nair et al. |
| 5,310,779 | A * | 5/1994 | Lai .................. C07C 69/96 |
| | | | 524/588 |
| 5,349,030 | A | 9/1994 | Long, II et al. |
| 5,470,900 | A | 11/1995 | Sasaki et al. |
| 5,654,362 | A | 8/1997 | Schulz, Jr. et al. |
| 5,697,441 | A | 12/1997 | Vercaemer et al. |
| 6,279,655 | B1 | 8/2001 | Pafitis et al. |
| 6,375,880 | B1 | 4/2002 | Cooper et al. |
| 6,476,147 | B1 | 11/2002 | Sullivan et al. |
| 6,486,901 | B1 | 11/2002 | Deboer et al. |
| 6,936,212 | B1 | 8/2005 | Crawford |
| 6,942,830 | B2 | 9/2005 | Muelhaupt et al. |
| 7,049,346 | B1 | 5/2006 | Van Bladel et al. |
| 7,064,151 | B1 | 6/2006 | Berge et al. |
| 7,179,872 | B2 | 2/2007 | McCormick et al. |
| 7,285,237 | B2 | 10/2007 | Newell et al. |
| 8,133,341 | B2 | 3/2012 | Nealey et al. |
| 10,150,258 | B2 | 12/2018 | Feinberg et al. |
| 2004/0101518 | A1 | 5/2004 | Vacanti et al. |
| 2004/0120920 | A1 | 6/2004 | Lion et al. |
| 2004/0242837 | A1 | 12/2004 | Toyoda et al. |
| 2005/0247357 | A1 | 11/2005 | Welle |
| 2005/0282934 | A1 | 12/2005 | Brinkmann et al. |
| 2006/0136058 | A1 | 6/2006 | Pietrzak |
| 2006/0156978 | A1 | 7/2006 | Lipson et al. |
| 2006/0211790 | A1 | 9/2006 | Dimotakis et al. |
| 2009/0101271 | A1 | 4/2009 | Ishida |
| 2009/0171001 | A1 | 7/2009 | Lin et al. |
| 2010/0069522 | A1 * | 3/2010 | Linhardt .............. C08G 77/442 |
| | | | 522/112 |
| 2010/0102415 | A1 | 4/2010 | Millward et al. |
| 2010/0137534 | A1 | 6/2010 | Magnet et al. |
| 2010/0183977 | A1 | 7/2010 | Wang et al. |
| 2010/0184147 | A1 | 7/2010 | Cheng et al. |
| 2010/0304088 | A1 | 12/2010 | Steeman et al. |
| 2010/0321448 | A1 | 12/2010 | Buestgens et al. |
| 2011/0064810 | A1 | 3/2011 | Ghanavi |
| 2011/0103174 | A1 | 5/2011 | Jung et al. |
| 2011/0256085 | A1 | 10/2011 | Talingting Pabalan et al. |
| 2012/0040013 | A1 | 2/2012 | Owens et al. |
| 2012/0171258 | A1 | 7/2012 | Sefton et al. |
| 2013/0004385 | A1 | 1/2013 | Lee et al. |
| 2013/0029125 | A1 | 1/2013 | Tse et al. |
| 2013/0317131 | A1 * | 11/2013 | Scales .................... B82Y 30/00 |
| | | | 523/107 |
| 2013/0333891 | A1 | 12/2013 | Fripp et al. |
| 2013/0344601 | A1 | 12/2013 | Soman et al. |
| 2014/0005178 | A1 | 2/2014 | Kumar et al. |
| 2014/0186952 | A1 | 7/2014 | Alsberg et al. |
| 2014/0224349 | A1 | 8/2014 | Ducrée et al. |
| 2014/0275317 | A1 | 9/2014 | Moussa |
| 2014/0295541 | A1 | 10/2014 | Nakanishi et al. |
| 2014/0037746 | A1 | 12/2014 | Trefonas, III et al. |
| 2015/0056317 | A1 | 2/2015 | Chen |
| 2015/0057786 | A1 | 2/2015 | Murphy et al. |
| 2015/0091217 | A1 | 4/2015 | Araki |
| 2015/0093465 | A1 | 4/2015 | Page |
| 2015/0104639 | A1 | 4/2015 | Schroeyers et al. |
| 2015/0022558 | A1 | 8/2015 | Ohori et al. |
| 2015/0217024 | A1 | 8/2015 | Wang et al. |
| 2015/0031537 | A1 | 11/2015 | Mehta et al. |
| 2016/0062230 | A1 | 3/2016 | Wu et al. |
| 2016/0106663 | A1 | 4/2016 | Gulbin |
| 2016/0167312 | A1 | 6/2016 | Feinberg et al. |
| 2016/0019689 | A1 | 7/2016 | Ohori et al. |
| 2016/0215130 | A1 | 7/2016 | Esseghir et al. |

FOREIGN PATENT DOCUMENTS

| CN | 102164661 | 8/2011 |
| CN | 203305668 U | 11/2013 |
| FR | 2583334 | 12/1986 |
| FR | 2634686 | 2/1990 |
| JP | 2014207886 | 11/2014 |
| WO | 0178968 | 10/2001 |
| WO | 2006027702 | 3/2006 |
| WO | 2009139395 A1 | 11/2009 |
| WO | 2012155110 | 11/2012 |
| WO | 2014024048 | 2/2014 |
| WO | 2014039825 | 3/2014 |
| WO | 2014049204 | 4/2014 |
| WO | 2014182885 | 11/2014 |
| WO | 2014205261 | 12/2014 |
| WO | 2014209994 | 12/2014 |
| WO | 2015017421 A2 | 2/2015 |
| WO | 2015019212 A1 | 2/2015 |
| WO | 2015107333 | 7/2015 |
| WO | 2015138566 A1 | 9/2015 |
| WO | 2016044547 | 3/2016 |
| WO | 2018187595 A1 | 10/2018 |
| WO | 2018187780 A1 | 10/2018 |

OTHER PUBLICATIONS

Thermal Transitions of Homopolymers: Glass Transition & Melting Point, Sigma-Aldrich, 2019 (Year: 2019).*

Hinton, et al. "Three-dimensional printing of complex biological structures by freeform reversible embedding of suspended hydrogels," Sci. Adv. 1:e1500758.

Hinton, et al. "3D Printing PDMS Elastomer in Hydrophilic Support Bath via Freeform Reversible Embedding." ACS Biomater. Sci. Eng., May 4, 2016 (web).

Office Action received in Japanese Patent Application No. 2017-530102 dated Oct. 29, 2019. [English translation provided].

(56) References Cited

OTHER PUBLICATIONS

Rudert, et al. "Experimental and numerical investigation of a viscoplastic Carbopol gel injected into a prototype 3D mold cavity," J Non-Newtonian Fluid Mechanics, 2009, vol. 161, pp. 60-68.

Khalil, et al. "Multi-nozzle deposition for construction of 3D biopolymer tissue scaffolds," Rapid Prototyping Journal, 2005, vol. 11/1, pp. 9-17.

Antoni, D.; et al (2015) "Three-Dimensional Cell Culture: a Breakthrough in Vivo." International journal of molecular sciences, 16(3), pp. 5517-5527.

Baudonnet, L., J-L. ; et al. (2004) "Effect of Dispersion Stirring Speed on the Particle Size Distribution and Rheological Properties of Three Carbomers." Journal of dispersion science and technology 25.2 : 183-192.

Bayliss, K., et al. (2011) "Comparing Colloidal Phase Separation Induced by Linear Polymer and by Microgel Particles." Soft Matter 7.21 : 10345-10352.

Beck, Emily C., et al. (2015) "Enabling Surgical Placement of Hydrogels Through Achieving Paste-Like Rheological Behavior in Hydrogel Precursor Solutions." Annals of biomedical engineering 43.10 : 2569-2576.

Bhattacharjee Tapomoy, et al. (2016) "Liquid-Like Solids Support Cells in 3D." ACS Biomaterials Science & Engineering 2.10 : 1787-1795.

Chang, Ya-Wen, et al. (2015) "Biofilm Formation in Geometries with Different Surface Curvature and Oxygen Availability." New Journal of Physics 17.3 : 033017.

Chinese Office Action dated Feb. 15, 2019 for Chinese Patent Application 2015800755428.

Conrad, Jacinta C; et al. (2008) "Structure of Colloidal Gels During Microchannel Flow." Langmuir 24.15 : pp. 7628-7634.

Derby, Brian. (2012) "Printing and Prototyping of Tissues and Scaffolds." Science 338.6109 : 921-926.

Ellis, Perry W., et al. (2018) "Curvature-Induced Defect Unbinding and Dynamics in Active Nematic Toroids." Nature Physics 14.1 : 85-90.

European Search Report in Appln. No. 15865693.4 dated Jul. 18, 2018.

Hardin, James O., et al. (2015) "Microfluidic Printheads for Multimaterial 3D Printing of Viscoelastic Inks." Advanced materials 27.21 : 3279-3284.

International Search Report for PCT/US2016/031385 dated Aug. 11, 2016.

International Search Report issued in European Patent Application PCT/US2016/017810 dated Jul. 12, 2016.

International Search Report dated Feb. 16, 2016 for PCT Patent Application PCT/US2015/064063.

International Search Report dated Nov. 22, 2016 for PCT Patent Application No. PCT/US2016/050175.

International Search Report dated Dec. 30, 2016 for PCT Patent Application No. PCT/US2016/052102.

Jin, Yifei, et al. (2016) "Granular Gel Support-Enabled Extrusion of Three-Dimensional Alginate and Cellular Structures." Biofabrication 8.2 : 025016.

Landers, R, et al. Desktop manufacturing of complex objects, prototypes and biomedical scaffolds by means of computer-assisted design combined with computer-guided 3D plotting of polymers and reactive oligomers. Macromolecular Materials and Engineering 2000 282(1):17-21.

Moxon, Samuel Robert, (2016) "Development of Biopolymer Hydrogels as Complex Tissue ENgineering Scaffolds" Doctoral thesis, University of Huddersfield. 211 pages.

Murphy, Sean V., ; et al (2014) "3D Bioprinting of Tissues and Organs." Nature biotechnology 32.8 : 773-785.

Muth, JT, et al. Embedded 3D Printing of Strain Sensors within Highly Stretchable Elastomers; 2014, 26, pp. 6307-6312, Advanced Materials; www.advmat.de.

Pairam, E., H. Le,; et al (2014) "Stability of Toroidal Droplets Inside Yield Stress Materials." Physical Review E 90.2 : 021002.

Pairam, Ekapop, et al. (2013) "Stable Nematic Droplets with Handles." Proceedings of the National Academy of Sciences 110. 23: 9295-9300.

Pfister, Andreas, et al. (2004) "Biofunctional Rapid Prototyping for Tissue-Engineering Applications: 3D Bioplotting Versus 3D Printing." Journal of Polymer Science Part A: Polymer Chemistry 42.3: 624-638.

Rieger, J. (1996) "The Glass Transition Temperature of Polystyrene." Journal of thermal analysis 46.3-4 : 965-972.

Roberts, Geraint P., ; et al (2001) "New Measurements of the Flow-Curves for Carbopol Dispersions Without Slip Artefacts." Rheologica Acta 40.5 : 499-503.

Schaefermeier PK, et al. Design and fabrication of three-dimensional scaffolds for tissue engineering of human heart valves. Eur Surg Res. 2009 42(1):49-53.

Search Report issued in EP Patent Application 16793291, dated Feb. 5, 2019.

Smith, D.,'Multi-Material Breakthrough for 3D Printing'[Press Release] The Technology Partnership, Sep. 4, 2013.

The Diamond Hotend [Product] RepRap.me: http://reprap.me/fronlpage-show/diamond-holend.hlml.

The Technology Partnership. [Relevant Business; Melbourn, UK] http://www.llp.com/printing.

Tumbleston, John R., et al.(2015) "Continuous Liquid Interface Production of 3D Objects." Science 347.6228 : 1349-1352.

Wu, Kun-Ta, et al. (2017) "Transition From Turbulent to Coherent Flows in Confined Three-Dimensional Active Fluids." Science 355.6331 : eaal1979.

Office Action received in Japanese Patent Application No. 2017-557950 dated Jan. 7, 2020. [English translation provided].

International Search Report issued by the United States Patent Office for PCT/US16/64771, dated Jan. 18, 2017.

International Preliminary Report on Patentability issued by the United States Patent Office for PCT/US16/64771, dated Jun. 5, 2018.

* cited by examiner

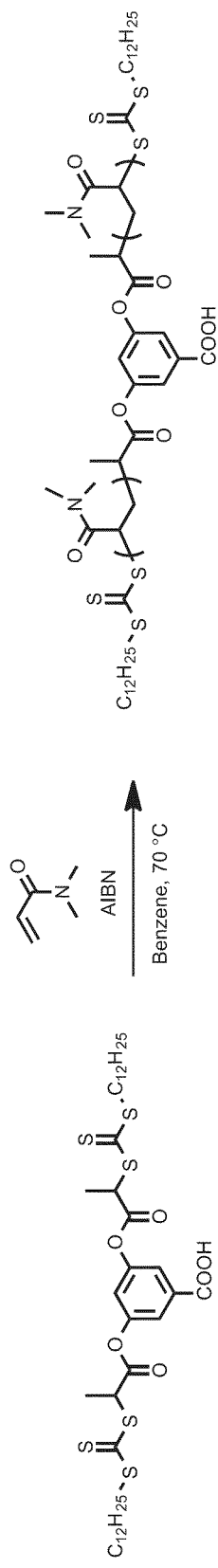
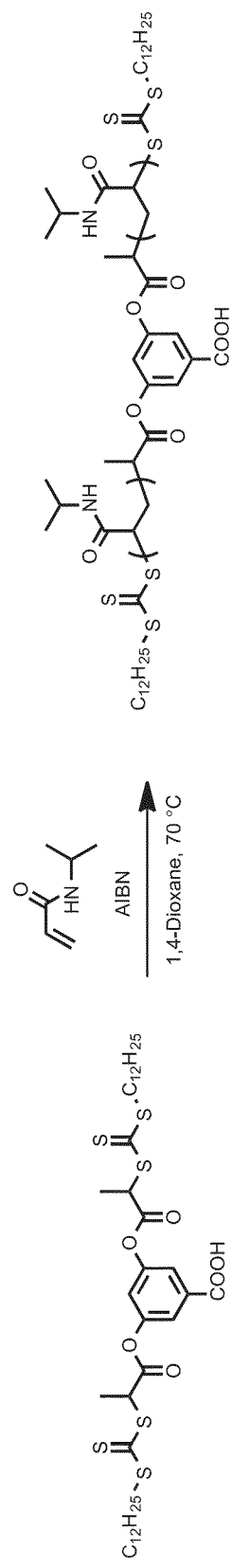
FIG. 2A
FIG. 2B

CROSSLINKABLE OR FUNCTIONALIZABLE POLYMERS FOR 3D PRINTING OF SOFT MATERIALS

CROSS-REFERENCE TO RELATED APPLICATIONS

This application is a continuation of International Application No. PCT/US2016/064771, filed Dec. 2, 2016, which claims benefit of U.S. Provisional Application No. 62/263,524, filed Dec. 4, 2015.

TECHNICAL FIELD

Embodiments described herein generally relate to compositions and methods for three-dimensional printing.

BACKGROUND

Conventional three-dimensional (3D) printing methods generally involve depositing layers of a material on a substrate. While conventional 3D printing methods can be used to fabricate a wide variety of structures, certain structures with complex geometries may pose challenges. For example, due to instabilities arising from surface tension and gravity, it may be difficult to produce high-aspect-ratio structures.

Accordingly, improved 3D printing methods are needed.

SUMMARY

Compositions and methods related to 3D printing are disclosed. The subject matter of the present invention involves, in some cases, interrelated products, alternative solutions to a particular problem, and/or a plurality of different uses of one or more systems and/or articles.

Certain embodiments relate to a composition for three-dimensional printing. In some embodiments, the composition comprises a polymer comprising one or more dormant functional groups. In certain cases, the one or more dormant functional groups comprise a thiocarbonylthio group, an alkoxyamine group, a halogen, and/or a cobalt-carbon bond. In some embodiments, the composition further comprises an initiator. In some embodiments, the composition further comprises a crosslinker.

Certain embodiments relate to a method of three-dimensional printing. In some embodiments, the method comprises injecting a composition comprising a polymer into a medium. In some embodiments, the polymer comprises one or more dormant functional groups. In certain cases, the one or more dormant functional groups comprise a thiocarbonylthio group, an alkoxyamine group, a halogen, and/or a cobalt-carbon bond. In some embodiments, the method further comprises crosslinking the polymer to form a crosslinked polymeric structure.

Certain embodiments relate to a system for three-dimensional printing. In some embodiments, the system comprises a composition comprising a polymer comprising one or more dormant functional groups. In certain cases, the one or more dormant functional groups comprise a thiocarbonylthio group, an alkoxyamine group, a halogen, and/or a cobalt-carbon bond. In some embodiments, the system comprises a medium comprising a yield stress material. In some cases, the system comprises a crosslinker, wherein the crosslinker is present in the composition and/or the medium. In certain cases, the system comprises an initiator, wherein the initiator is present in the composition and/or the medium.

Certain embodiments relate to a method of three-dimensional printing. In some embodiments, the method comprises injecting a composition comprising a polymer into a medium. In certain cases, the polymer comprises one or more pendent crosslinkable groups. In some embodiments, the medium comprises a yield stress material. In some embodiments, the method further comprises crosslinking the pendent crosslinkable groups of the polymer to form a crosslinked polymeric structure.

It should be appreciated that the foregoing concepts, and additional concepts discussed below, may be arranged in any suitable combination, as the present disclosure is not limited in this respect. Further, other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

DESCRIPTION OF DRAWINGS

FIG. 2A shows, according to some embodiments, an exemplary reaction scheme for forming difunctional poly(N,N-dimethylacrylamide) (PDMA) through RAFT polymerization;

FIG. 2B shows, according to some embodiments, an exemplary reaction scheme for forming difunctional poly(N-isopropylacrylamide) (PNIPAM) through RAFT polymerization;

DETAILED DESCRIPTION

Figure 1:
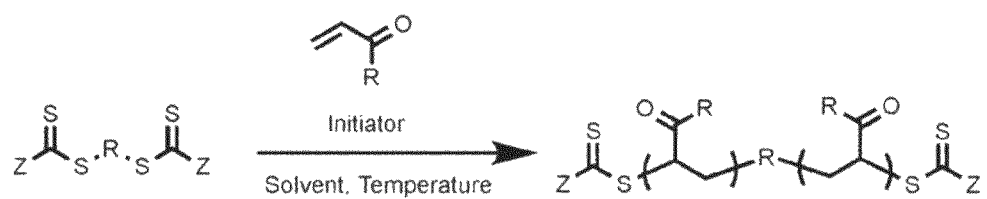
FIG. 1 shows an exemplary reaction scheme for forming a difunctional polymer through RAFT polymerization, according to some embodiments.

Described herein are embodiments of compositions and methods relating to three-dimensional (3D) printing. Some embodiments are directed to a composition comprising a polymer with one or more dormant functional groups (e.g., a thiocarbonylthio group, an alkoxyamine group, a halogen, and/or a cobalt-carbon bond). According to some embodiments, the polymer may be formed through a controlled radical polymerization method, such as reversible addition-fragmentation chain transfer (RAFT) polymerization, atom transfer radical polymerization (ATRP), nitroxide-mediated polymerization, and/or cobalt-mediated radical polymerization. According to some embodiments, the composition may be used as an "ink" in a method of 3D printing. For example, in some embodiments, the composition may be injected into a medium (e.g., a yield stress material). The composition and/or medium may, in some embodiments, further comprise an initiator and/or a crosslinker. After injection of the composition into the medium, the one or more dormant functional groups may be reactivated, and the polymer may be crosslinked (e.g., by the crosslinker). In certain cases, the crosslinked polymer may be removed from the medium to produce a freestanding three-dimensional structure.

According to some embodiments, 3D printing involves injecting a first material (e.g., a composition) into a second material (e.g., a medium). In certain cases, injecting comprises causing a temporary phase change (e.g., from solid to liquid) in a region of the second material by applying focused energy to the region using a focused energy source, and displacing the second material in the region with the first material. For example, in some embodiments, the second material is a medium that fluidizes at the point of injection and then rapidly solidifies, trapping the injected material in place. As discussed in further detail below, the medium may be a "yield stress" material. A yield stress material generally refers to a material that is a solid (or some other solid-like phase in which the material retains its shape) under applied stresses at levels below its yield stress and a fluid (or some other phase in which the material may alter its shape) under applied stresses at levels exceeding its yield stress. In some cases, a yield stress material in the fluid (or fluid-like) phase under an applied stress may return to the solid (or solid-like) phase after the applied stress is removed. Examples of suitable yield stress materials include, but are not limited to, granular gels and physically crosslinked gels.

In some cases, use of a yield stress material as a medium for 3D printing may be associated with certain advantages. For example, a desired structure may be printed without having to print support material as well. Instead, the yield stress material may become the support material by conforming to the printed volume and, after injection, reverting to a phase that constrains the volume. This approach may decrease costs and manufacturing time as compared to conventional 3D printing systems. In addition, a yield stress material may allow structures with complex geometries to be printed.

Previously, only a limited number of polymers were used as inks for 3D printing in yield stress materials. However, the inventors have recognized that a much wider range of polymers may be used if the polymer comprises one or more dormant functional groups. A dormant functional group generally refers to a functional group that is inactive (i.e., not actively undergoing polymerization) until activated. In some cases, a polymer comprising one or more dormant functional groups may be formed by controlled radical polymerization. In some embodiments, a composition comprising a polymer comprising one or more dormant functional groups may be injected into a medium. In certain cases, following injection, the one or more dormant functional groups may be activated and may react with a crosslinker. In certain cases, following injection, the one or more dormant functional groups may be activated and may thereby be converted into one or more crosslinkable functional groups. Examples of suitable dormant functional groups include, but are not limited to, thiocarbonylthio groups, alkoxyamine groups, groups comprising a halogen, groups comprising a cobalt-carbon bond, and other dormant functional groups employed in controlled radical polymerization.

In some embodiments, a polymer comprising one or more dormant functional groups may be formed through a controlled radical polymerization process. A controlled radical polymerization process, which can also be referred to as a living radical polymerization process or a reversible-deactivation radical polymerization process, generally refers to a chain-growth polymerization process in which the active polymer chain comprises a free radical and early termination of the polymer chain is minimized, with polymerization proceeding until the monomer is consumed or the process is intentionally terminated. In some cases, a controlled radical polymerization process may be used to synthesize polymers having a desired molecular weight and a narrow molecular weight distribution (i.e., low polydispersity). In addition, controlled radical polymerization processes often can be used with a broad range of monomers (e.g., vinyl monomers) and/or can be conducted under relatively mild conditions (e.g., relatively low temperatures). Non-limiting examples of controlled radical polymerization processes include reversible addition-fragmentation chain transfer (RAFT) polymerization, atom transfer radical polymerization (ATRP), nitroxide-mediated radical polymerization, and cobalt-mediated radical polymerization.

In some embodiments, at least one polymer is formed through reversible addition-fragmentation chain transfer (RAFT) polymerization. A RAFT polymerization system generally comprises an initiator (e.g., a photoinitiator, a thermal initiator, a redox initiator) that can act as a radical source, one or more monomers (e.g., vinyl monomers), a RAFT agent (also referred to as a chain transfer agent), and, optionally, a solvent. Without wishing to be bound by a particular theory, the mechanism of a RAFT polymerization process can briefly be described as follows. First, the RAFT polymerization process generally begins when the initiator forms free radicals (e.g., through homolytic bond cleavage). In some cases, at least one of the free radicals may subsequently react with a monomer to form a monomer radical. The monomer radical may then react with one or more additional monomers to form an active polymer chain (i.e., a polymer radical). In some cases, the active polymer chain may react with a RAFT agent comprising at least one dormant functional group (e.g., a thiocarbonylthio group) to form a RAFT adduct radical comprising the polymer chain and the at least one dormant functional group. In some cases, the RAFT adduct radical may undergo a fragmentation reaction in which a substituent of the dormant functional group leaves, forming a leaving group radical comprising the substituent and a polymer comprising the remainder of the at least one dormant functional group. In some cases, the RAFT adduct radical may undergo a fragmentation reaction in which the polymer chain leaves, forming the starting materials, the polymer chain and the RAFT agent. When a leaving group radical is formed, it may react with another monomer to form another active polymer chain. In some cases, an active polymer chain $P_m$ (i.e., a chain formed from m monomers) may react with a RAFT agent as described above. In some cases, the active polymer chain $P_m$ may react with a polymer chain $P_n$ (i.e., a chain formed from n monomers) comprising at least one dormant functional group. In some such cases, a RAFT adduct radical comprising $P_n$, $P_m$, and at least one thiocarbonylthio group may be formed. The RAFT adduct radical may undergo a fragmentation reaction in which either $P_n$ or $P_m$ leaves as an active polymer chain, resulting either in a polymer chain $P_n$ comprising at least one dormant functional group and an active polymer chain $P_m$ or a polymer chain $P_m$ comprising at least one dormant functional group and an active polymer chain $P_n$. In the main RAFT equilibrium, the radicals are generally shared among all species that have not been terminated (i.e., active polymer chains and polymers comprising at least one dormant functional group) through a rapid exchange process in which dormant chains become active and active chains become dormant. In some cases, active polymer chains may be terminated through bi-radical termination (e.g., combination or disproportionation) to form dead polymer chains that cannot react further (e.g., active polymer chain $P_n$ and active polymer chain $P_m$ react to form dead polymer chain $D_{n+m}$ or dead polymer chains $D_n$ and $D_m$).

FIG. 1 illustrates, according to some embodiments, an exemplary reaction scheme in which a RAFT agent comprising two thiocarbonylthio groups, a vinyl monomer, and an initiator are reacted in a solvent at a temperature to form a polymer comprising a first thiocarbonylthio group at a first terminal end, repeat units formed from the vinyl monomer, and a second thiocarbonylthio group at a second terminal end.

FIGS. 2A and 2B illustrate more specific RAFT polymerization reaction schemes. For example, FIG. 2A illustrates, according to some embodiments, an exemplary reaction scheme in which 3,5-bis(2-dodecylthiocarbonothioylthio-1-oxopropoxy)benzoic acid is used as a RAFT agent and reacted with N,N-dimethylacrylamide monomers in benzene at 70° C., with azobisisobutyronitrile (AIBN) as an initiator, to form a poly(N,N-dimethylacrylamide) (PDMA) chain with a 2-dodecylthiocarbonothioylthio-2-methylpropionic acid moiety at each terminal end. In some cases, the difunctional PDMA formed according to the reaction scheme of FIG. 2A has a number average molecular weight of about 48.8 kg/mol and a polydispersity index of 1.05. FIG. 2B illustrates, according to some embodiments, an exemplary reaction scheme in which 3,5-bis(2-dodecylthiocarbonothioylthio-1-oxopropoxy)benzoic acid is used as a RAFT agent and reacted with N,N-isopropylacrylamide monomers in 1,4-dioxane at 70° C., with AIBN as an initiator, to form a poly(N-isopropylacrylamide) (PNIPAM) chain with a 2-dodecylthiocarbonothioylthio-2-methylpropionic acid moiety at each terminal end. In some cases, the difunctional PNIPAM formed according to the reaction scheme of FIG. 2B has a number average molecular weight of about 30.0 kg/mol and a polydispersity index of 1.01.

In some embodiments, the RAFT agent has a structure of Formula (I):

(I)

where Z is a first substituent and R is a second substituent. In certain embodiments, R is a free-radical leaving group capable of reinitiating polymerization. Examples of suitable groups for R include, but are not limited to, cyano groups, cyanoalkyl groups (e.g., cyanomethyl, cyanoethyl), cyanoaryl groups (e.g., cyanophenyl), aryl groups (e.g., phenyl, tolyl, naphthyl), arylalkyl groups (e.g., methylphenyl, ethylphenyl), and alkyl groups (e.g., methyl, ethyl, propyl, isopropyl, butyl, pentyl, hexyl). In some embodiments, Z is a substituent that can influence the reactivity of the carbon-sulfur double bond and, therefore, the rates of radical addition and/or fragmentation.

Examples of suitable groups for Z include, but are not limited to, alkyl groups (e.g., methyl, ethyl, propyl, isopropyl, butyl, pentyl, hexyl), aryl groups (e.g., phenyl, tolyl, naphthyl), S-alkyl groups (e.g., S-methyl, S-ethyl), N-alkyl groups (e.g., N-methyl, N-diethyl), heterocyclic groups (e.g., pyrrole), alkoxy groups (e.g., methoxy, ethoxy), and/or aryloxy groups (e.g., phenoxy). In some embodiments, the RAFT agent is a dithiobenzoate, a trithiocarbonate, a dithiocarbamate, a dithioester, or a xanthate.

In some embodiments, at least one polymer is prepared by atom transfer radical polymerization (ATRP). An ATRP system generally comprises an initiator (e.g., an alkyl halide), one or more monomers, a metal catalyst (e.g., a transition metal complex), and a solvent. Without wishing to be bound by a particular theory, the mechanism of an ATRP polymerization process can briefly be described as follows. First, the ATRP process generally begins by reacting the initiator, which comprises a transferable atom or group (e.g., a halogen), with the metal catalyst. In some cases, a radical (e.g., an alkyl radical) and an oxidized complex comprising the metal catalyst and the transferable atom or group may be formed through a reversible one-electron redox reaction. The free radical may then react with a monomer to form a monomer radical, and the monomer radical may react with one or more additional monomers to form an active polymer chain. In some cases, the active polymer chain may be deactivated through donation of the transferable atom or group from the oxidized complex to the polymer chain, thereby forming a polymer with a dormant functional group comprising the transferable atom or group. In some embodiments, the dormant functional group comprises a halogen (e.g., fluorine, chlorine, bromine, iodine, astatine).

In some embodiments, the metal catalyst is a transition metal complex. Non-limiting examples of suitable transition metals include copper, iron, ruthenium, nickel, osmium, and rhodium. In certain embodiments, the metal catalyst comprises one or more ligands. In some cases, the one or more ligands comprise bidentate, tridentate, and/or tetradentate nitrogen-comprising ligands. Examples of suitable amine ligands include, but are not limited to, N,N,N',N'',N''-pentamethyldiethylenetriamine (PMDETA), 2,2'-bipyridine (bpy), 4,4'-di-5-nonyl-2,2'-bipyridine (dNbpy), hexamethyltriethylenetetramine (HMTETA), tris(2-aminoethyl)amine (TREN), tris(2-dimethylaminoethyl)amine ($Me_6TREN$) and tetramethylethylenediamine (TMEDA).

In some embodiments, at least one polymer is prepared by nitroxide-mediated radical polymerization (NMP). In certain NMP processes, an alkoxyamine initiator is used to generate polymers comprising a dormant functional group comprising an alkoxyamine. Control of the polymerization may be achieved through an active-dormant equilibrium of an active polymer radical and nitroxide radical (e.g., 2,2,6,6,tetramethylpiperidine-1-oxyl (TEMPO)) in equilibrium with a dormant alkoxyamine-containing polymer.

In some embodiments, at least one polymer is prepared by cobalt-mediated radical polymerization (CMRP). In some cases, a cobalt compound (e.g., a cobaloxime, a cobalt porphyrin) is used to catalyze and mediate formation of polymers comprising a dormant functional group comprising a bond between carbon and cobalt.

In some embodiments, the controlled radical polymerization reaction may occur under relatively mild conditions. For example, in some cases, polymerization may proceed at a relatively low temperature. In certain cases, the temperature at which polymerization is carried out is about 100° C. or less, about 90° C. or less, about 80° C. or less, about 70° C. or less, about 60° C. or less, about 50° C. or less, about 40° C. or less, about 30° C. or less, about 20° C. or less, about 10° C. or less, about 0° C. or less, or about –10° C. or less. In some embodiments, the temperature at which polymerization is carried out is in the range of about –10° C. to about 20° C., –10° C. to about 50° C., –10° C. to about 100° C., about 0° C. to about 20° C., about 0° C. to about 30° C., about 0° C. to about 40° C., about 0° C. to about 50° C., about 0° C. to about 100° C., about 10° C. to about 20° C., about 10° C. to about 30° C., about 10° C. to about 40° C., about 10° C. to about 50° C., about 10° C. to about 100° C., about 20° C. to about 30° C., about 20° C. to about 40° C., about 20° C. to about 50° C., about 20° C. to about 60° C., about 20° C. to about 70° C., about 20° C. to about 80° C., about 20° C. to about 90° C., about 20° C. to about 100° C., about 30° C. to about 50° C., about 30° C. to about 100° C., about 50° C. to about 60° C., about 50° C. to about 70° C., about 50° C. to about 80° C., about 50° C. to about 90° C., or about 50° C. to about 100° C.

In some cases, the controlled radical polymerization reaction may occur in the presence of a solvent. Non-limiting examples of suitable solvents include benzene, toluene, xylene, tetrahydrofuran (THF), 1,4-dioxane, anisole, N,N-dimethylformamide (DMF), N,N-dimethyl acetamide (DMAC), dimethyl sulfoxide (DMSO), water, methanol, ethanol, and acetonitrile. One of ordinary skill in the art would be able to select the appropriate reaction conditions (e.g., temperature, solvent, time) given the type of polymerization process, the monomers, and the identities of other reagents (e.g., RAFT agent, metal catalyst).

In some embodiments, in a polymer comprising one or more dormant functional groups (e.g., a polymer formed by a controlled radical polymerization process), at least a portion of the one or more dormant functional groups are end groups. In some embodiments, all of the dormant functional groups are end groups. In certain cases, a first dormant functional group is attached to a first terminal end of a polymer, and a second dormant functional group is attached to a second terminal end of the polymer. In some embodiments, the polymer is a homotelechelic polymer (i.e., the first dormant functional group attached to the first terminal end is identical to the second dormant functional group attached to the second terminal end). In certain embodiments, the polymer is a heterotelechelic polymer (i.e., the first dormant functional group attached to the first terminal end is different from the second dormant functional group attached to the second terminal end). In some embodiments, more than two dormant functional end groups are present (e.g., the polymer is a "star" polymer). In some embodiments, at least a portion of the one or more dormant functional groups are pendent groups.

In addition to the one or more dormant functional groups, the polymer may comprise two or more repeat units. As is well recognized in the art, a repeat unit is an atom or group of atoms (including pendent atoms or groups, if any), the repetition of which comprises a part of the essential structure of the polymer. Those of ordinary skill in the art will be able to identify and describe the repeat units that a polymer comprises. A polymer is generally formed through polymerization of a plurality of monomers (also referred to as monomeric precursors). In some cases, the polymer is a homopolymer (e.g., formed through polymerization of a single type of monomer). A homopolymer generally has one type of repeat unit. In some embodiments, the polymer is a copolymer (e.g., formed through polymerization of two or more types of monomers). A copolymer generally has two or more types of repeat units. The two or more types of repeat units may be distributed within the polymer in any order, including random orders and periodic orders, such as alternating, block, or other repeating orders. In some embodiments, the polymer is a gradient and/or star polymer. In some embodiments, the polymer is a microgel and/or a polymer brush. The polymer can have block, graft, comb, hyperbranched, and/or star structures.

The polymer may be formed from any suitable monomer or combination of monomers. In some embodiments, at least a portion of the monomers are vinyl monomers. Non-limiting examples of suitable monomers include methyl methacrylate, ethyl acrylate, N-propyl methacrylate, isopropyl methacrylate, N-butyl methacrylate, isobutyl methacrylate, tert-butyl methacrylate, 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, N-propyl acrylate, isopropyl acrylate, N-butyl acrylate, isobutyl acrylate, tert-butyl acrylate, 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, 2-hydroxy-1-propyl methacrylate, 1-hydroxy-2-propyl methacrylate, 1-hydroxy-3-propyl methacrylate, hydroxybutyl methacrylate (all isomers), N—N-dimethylaminoethyl methacrylate, N—N-diethylaminoethyl methacrylate, triethyleneglycol acrylate, methacrylamide, N-methylacrylamide, N,N-dimethylacrylamide, N-tert-butylmethacrylamide, N,N-butylmethacrylamide, N-methylolacrylamide, N-ethylolacrylamide, vinyl benzoic acid (all isomers), diethylaminostyrene (all isomers), alpha-methylvinyl benzoic acid (all isomers), diethylamino-methylstyrene (all isomers), p-vinylbenzenesulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, isoprene, chloroprene, ethylene, propylene, 1,5-hexadienes, 1,4-hexadienes, 1,3-butadienes, and 1,4-pentadienes. According to some embodiments, at least one of the monomers comprises vinylalcohol, vinylamine, N-alkylvinylamine, allylamine, N-alkylallylamine, diallylamine, N-dialkyldiallylamine, alkyleneimine, acrylic acids, alkylacrylates, acrylamides, methacrylic acids, alkylmethacrylates, methacrylamides, N-alkylacrylamides, N-alkylmethylacrylamides, styrene, vinylnaphthalene, vinyl pyridine, ethylvinylbenzene, aminostyrene, vinylbiphenyl, vinylanisole, vinylimidazolyl, vinylpyridinyl, dimethylaminomethylstyrene, trimethylammonium ethyl methacrylate, trimethylammonium ethyl acrylate, dimethylamino propylacrylamide, trimethylammonium ethylacrylate, trimethylammonium ethyl methacrylate, trimethylammonium propyl acrylamide, dodecyl acrylate, octadecyl acrylate, and/or octadecyl methacrylate. Non-limiting examples of suitable monomers include alkylacrylamides, methacrylamides, acrylamides, styrenes, allylamines, allylammonium, diallylamines, diallylammoniums, dialkylacrylates, methacrylates, acrylates, n-vinyl formamide, vinyl ethers, vinyl sulfonate, acrylic acid, sulfobetaines, carboxybetaines, phosphobetaines, and/or maleic anhydride. In some embodiments, at least some of the monomers comprise alkylacrylates, methacrylates, acrylates, alkylacrylamides, methacrylamides, acrylamides, and/or styrenes.

Figure 3A:
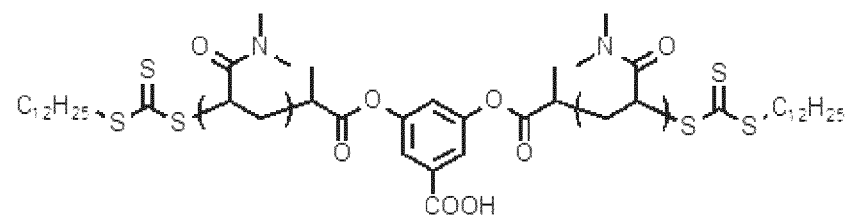
FIG. 3A shows an exemplary structure for a difunctional PNIPAM, according to some embodiments.
Figure 3B:
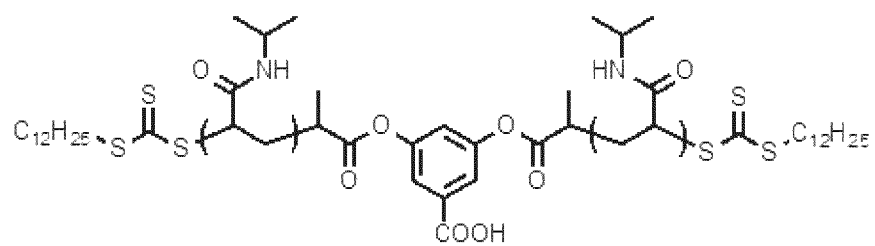
FIG. 3B shows an exemplary structure for a difunctional PDMA, according to some embodiments.
Figure 3C:
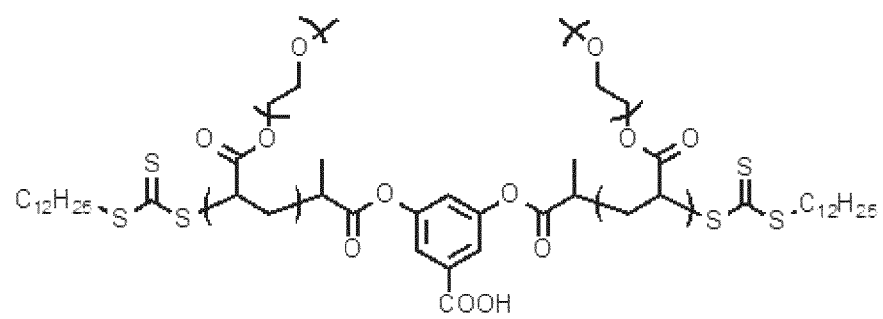
FIG. 3C shows an exemplary structure for a difunctional poly[poly(ethylene glycol acrylate)] (PPEGA), according to some embodiments.

Non-limiting examples of suitable polymers comprising one or more dormant functional groups include poly(N-isopropylacrylamide) (PNIPAM), poly(N,N-dimethylacrylamide) (PDMA), poly[poly(ethylene glycol acrylate)] (PPEGA), poly(2-acrylamido-2-methylpropane sulfonic acid (PAMPS), and polymers derived from polydimethylsiloxane (PDMS) macromonomers (e.g., PDMS containing a polymerizable group such as a styrenic group, an acrylamide group, a methacrylamido group, an acrylic group, and/or a methacrylic group). An exemplary structure of a difunctional PNIPAM is shown in FIG. 3A, an exemplary structure of a difunctional PDMA is shown in FIG. 3B, and an exemplary structure of a difunctional PPEGA is shown in FIG. 3C.

In some embodiments, the polymer comprising one or more dormant functional groups has a relatively high molecular weight. In some cases, it may be advantageous for the polymer to have a relatively high molecular weight to avoid diffusion of the polymer through the medium. In certain embodiments, the polymer comprising one or more dormant functional groups has a number average molecular weight of at least about 500 g/mol, at least about 1000 g/mol, at least about 2000 g/mol, at least about 5000 g/mol, at least about 10,000 g/mol, at least about 20,000 g/mol, at least about 30,000 g/mol, at least about 40,000 g/mol, at least about 45,000 g/mol, at least about 50,000 g/mol, at least about 60,000 g/mol, at least about 70,000 g/mol, at least about 80,000 g/mol, at least about 90,000 g/mol, at least about 100,000 g/mol, at least about 200,000 g/mol, at least about 300,000 g/mol, at least about 400,000 g/mol, or at least about 500,000 g/mol. In some embodiments, the polymer comprising one or more dormant functional groups has a number average molecular weight in the range of about 500 g/mol to about 5000 g/mol, about 500 g/mol to about 10,000 g/mol, about 500 g/mol to about 20,000 g/mol, about 500 g/mol to about 30,000 g/mol, about 500 g/mol to about 40,000 g/mol, about 500 g/mol to about 45,000 g/mol, about 500 g/mol to about 50,000 g/mol, about 500 g/mol to about 60,000 g/mol, about 500 g/mol to about 70,000 g/mol, about 500 g/mol to about 80,000 g/mol, about 500 g/mol to about 90,000 g/mol, about 500 g/mol to about 100,000 g/mol, about 500 g/mol to about 200,000 g/mol, about 500 g/mol to about 300,000 g/mol, about 500 g/mol to about 400,000 g/mol, about 500 g/mol to about 500,000 g/mol, about 10,000 g/mol to about 20,000 g/mol, about 10,000 g/mol to about 30,000 g/mol, about 10,000 g/mol to about 40,000 g/mol, about 10,000 g/mol to about 45,000 g/mol, about 10,000 g/mol to about 50,000 g/mol, about 10,000 g/mol to about 60,000 g/mol, about 10,000 g/mol to about 70,000 g/mol, about 10,000 g/mol to about 80,000 g/mol, about 10,000 g/mol to about 90,000 g/mol, about 10,000 g/mol to about 100,000 g/mol, about 10,000 g/mol to about 200,000 g/mol, about 10,000 g/mol to about 300,000 g/mol, about 10,000 g/mol to about 400,000 g/mol, about 10,000 g/mol to about 500,000 g/mol, about 40,000 g/mol to about 50,000 g/mol, about 40,000 g/mol to about 60,000 g/mol, about 40,000 g/mol to about 70,000 g/mol, about 40,000 g/mol to about 80,000 g/mol, about 40,000 g/mol to about 90,000 g/mol, about 40,000 g/mol to about 100,000 g/mol, about 40,000 g/mol to about 200,000 g/mol, about 40,000 g/mol to about 300,000 g/mol, about 40,000 g/mol to about 400,000 g/mol, about 40,000 g/mol to about 500,000 g/mol, about 80,000 g/mol to about 100,000 g/mol, about 80,000 g/mol to about 200,000 g/mol, about 80,000 g/mol to about 300,000 g/mol, about 80,000 g/mol to about 400,000 g/mol, about 80,000 g/mol to about 500,000 g/mol, about 100,000 g/mol to about 200,000 g/mol, about 100,000 g/mol to about 300,000 g/mol, about 100,000 g/mol to about 400,000 g/mol, or about 100,000 g/mol to about 500,000 g/mol.

Number average molecular weight $M_n$ may be obtained by taking the number average of the molecular weights of individual polymer chains, according to Formula 2:

$$M_n = \frac{\sum M_i N_i}{\sum N_i} \quad (2)$$

where $N_i$ is the number of chains of molecular weight $M_i$. One method of measuring number average molecular weight is gel permeation chromatography.

In some embodiments, the polymer has a relatively narrow molecular weight distribution. In some cases, for example, the polymer has a relatively low polydispersity index. The polydispersity index (PDI) may be calculated according to Formula 3:

$$PDI = \frac{M_w}{M_n} \quad (3)$$

where $M_w$ is weight average molecular weight and $M_n$ is number average molecular weight. One method of measuring $M_w$ and $M_n$ is gel permeation chromatography. In some embodiments, the polydispersity index of the polymer is about 4 or less, about 3.5 or less, about 3 or less, about 2.5 or less, about 2 or less, about 1.5 or less, about 1.4 or less, about 1.3 or less, about 1.2 or less, about 1.1 or less, about 1.05 or less, about 1.01 or less, or about 1.0. In some embodiments the polydispersity index of the polymer is in the range of about 1 to 4, about 1 to 3.5, about 1 to 3, about 1 to 2.5, about 1 to 2, about 1 to about 1.5, about 1 to about 1.4, about 1 to about 1.3, about 1 to about 1.2, about 1 to about 1.1, or about 1 to about 1.05.

In some embodiments, the composition comprises a polymer comprising one or more pendent crosslinkable groups. For example, in some embodiments, one or more pendent crosslinkable groups may be added to a polymer via post-polymerization modification. In certain embodiments, the polymer comprising one or more pendent crosslinkable groups may be prepared from one or more monomers containing two or more polymerizable groups (e.g., vinyl groups), where one group is significantly more reactive than the other. For example, a monomer may comprise a first, more reactive polymerizable group and a second, less reactive polymerizable group. Examples of suitable groups for the first, more reactive polymerizable group include, but are not limited to, methacrylate, styrenic, acrylate, and acrylamide groups. Examples of suitable groups for the second, less reactive polymerizable group include, but are not limited to, vinyl ester and vinyl amide groups. In some cases, a polymer may be formed through polymerization of the first, more reactive polymerizable groups. The second, less reactive polymerizable groups may remain in the resultant polymer as pendent crosslinkable groups.

According to some embodiments, the polymer of the composition (e.g., a polymer comprising a dormant functional group, a polymer comprising one or more pendent crosslinkable groups) has a relatively low crosslinking density. In some embodiments, for example, the polymer has a crosslinking density of about $1\times10^{-3}$ mol/cm$^3$ or less, about $5\times10^{-4}$ mol/cm$^3$ or less, about $1\times10^{-4}$ mol/cm$^3$ or less, about $5\times10^{-5}$ mol/cm$^3$ or less, or about $1\times10^{-5}$ mol/cm$^3$ or less. In certain embodiments, the polymer has a crosslinking density in the range of about 0 mol/cm$^3$ to about $1\times10^{-3}$ mol/cm$^3$, about 0 mol/cm$^3$ to about $5\times10^{-4}$ mol/cm$^3$, about 0 mol/cm$^3$ to about $1\times10^{-4}$ mol/cm$^3$, about 0 mol/cm$^3$ to about $5\times10^{-5}$ mol/cm$^3$, or about 0 mol/cm$^3$ to about $1\times10^{-3}$ mol/cm$^3$. In some embodiments, the polymer may be substantially uncrosslinked prior to and/or during injection of the composition into a medium (e.g., the polymer may have no greater degree of crosslinking than is inherent to the polymer). The crosslinking density of a composition and/or polymer may be determined by using the formula n=E/3RT, where E is the Young's modulus evaluated from a tensile test (e.g., a test conducted according to ASTM D575), R is the ideal gas constant, and T is temperature. In some cases, the crosslinking density is measured at a temperature of about 298 K.

In some cases, a polymer having a relatively low crosslinking density may exhibit certain material properties that facilitate injection of the polymer into a medium. For example, in some embodiments, the polymer has a relatively low glass transition temperature T. In certain cases, the polymer has a glass transition temperature of about 250° C. or less, about 225° C. or less, about 200° C. or less, about 175° C. or less, about 150° C. or less, about 125° C. or less, about 100° C. or less, about 75° C. or less, about 50° C. or less, about 20° C. or less, about 0° C. or less, or about −10° C. or less. In some embodiments, the polymer as a glass transition temperature in the range of about −10° C. to about 250° C., about 0° C. to about 250° C., about 0° C. to about 225° C., about 0° C. to about 200° C., about 0° C. to about 175° C., about 0° C. to about 150° C., about 0° C. to about 100° C., about 0° C. to about 75° C., about 0° C. to about 50° C., about 0° C. to about 20° C., about 20° C. to about 250° C., about 20° C. to about 225° C., about 20° C. to about 200° C., about 20° C. to about 175° C., about 20° C. to about 150° C., about 20° C. to about 100° C., about 20° C. to about 75° C., or about 20° C. to about 50° C. In some cases, it may be desirable for a polymer of the composition to have a relatively low glass transition temperature, as it may allow the composition to be injected at lower temperatures. One method of measuring glass transition temperature is by using differential scanning calorimetry according to ASTM D7426.

In some cases, a composition comprising a polymer having a relatively low molecular weight and/or crosslinking density has a relatively low viscosity. In some embodiments, the composition has a viscosity of about 5000 centipoise (cP) or less, about 2000 cP or less, about 1000 cP or less, about 500 cP or less, about 200 cP or less, about 100 cP or less, about 50 cP or less, about 20 cP or less, about 10 cP or less, about 5 cP or less, about 2 cP or less, or about 1 cP or less prior to and/or during injection of the composition into a medium. In some embodiments, prior to and/or during injection of the composition into a medium, the composition has a viscosity in the range of about 1 cP to about 10 cP, about 1 cP to about 50 cP, about 1 cP to about 100 cP, about 1 cP to about 500 cP, about 1 cP to about 1000 cP, or about 1 cP to about 5000 cP. The viscosity of the composition may be measured using a differential viscometer according to ASTM D5225. In some cases, a relatively low viscosity of the composition may facilitate injection of the composition into a medium.

According to some embodiments, at least a portion of the polymer of the composition may be crosslinked (i.e., crosslinking bonds connect two or more polymer chains within the composition) after the composition has been injected into the medium. For example, a crosslinker may react with functional groups of at least two polymer chains (e.g., a first functional group at a first end of a first polymer chain and a second functional group at a second end of a second polymer chain, a first pendent crosslinkable group of a first polymer chain and a second pendent crosslinkable group of a second polymer chain), thereby connecting a first polymer chain and a second polymer chain of the composition. In some embodiments, the crosslinker may be connected to at least one polymer chain through a covalent bond or an ionic bond. In some embodiments, the crosslinker may be connected to at least two polymer chains through covalent bonds and/or ionic bonds. Together, the crosslinked polymer chains may form a crosslinked polymer network. In certain embodiments, the crosslinked polymer network is an end-linked polymer network (e.g., a network linked at polymer chain ends). In some cases, after injecting and crosslinking of the composition, the composition may be referred to as a crosslinked polymer structure.

According to some embodiments in which the composition comprises a polymer comprising one or more dormant functional groups, at least a portion of the one or more dormant functional groups of the polymer of the composition may be activated after injection of the composition into a medium. In some cases, for example, one or more dormant functional groups may be activated, directly or indirectly, by one or more initiators. In some embodiments, the initiator may generate a radical species that may directly react with a dormant functional group of the polymer, thereby activating the functional group. In some cases, however, a radical species generated by an initiator may react with one or more other substances present in the composition and/or the medium. For example, as discussed in further detail below, one or more crosslinkers may be present in the composition and/or the medium. In some embodiments, a first radical species generated by an initiator may react with a crosslinker to form a second radical species. In some cases, the second radical species may react with a dormant functional group of the polymer, thereby activating the functional group. In certain embodiments, one or more activating agents may be present in the composition and/or the medium. In some cases, for example, the one or more activating agents may comprise a metal catalyst (e.g., a transition metal complexed with one or more ligands). In some cases, a first radical species generated by an initiator may react with an activating agent to form a third radical species that may react with a dormant functional group of the polymer.

According to some embodiments in which the composition comprises a polymer comprising one or more pendent crosslinkable groups, at least a portion of the one or more pendent crosslinkable groups may be activated after injection of the composition into a medium.

Figure 6A:
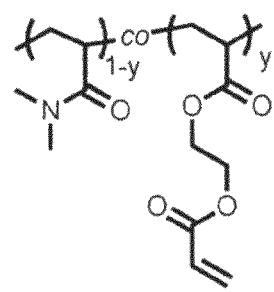
FIG. 6A shows, according to some embodiments, an exemplary structure for a poly(N,N-dimethylacrylamide) (PDMA) copolymer with pendent acrylate groups.
Figure 6B:
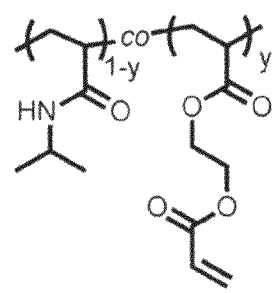
FIG. 6B shows, according to some embodiments, an exemplary structure for a poly(N-isopropylacrylamide) (PNIPAM) copolymer with pendent acrylate groups.

In some embodiments, the polymer comprises one or more pendent crosslinkable groups may be activated, directly or indirectly, by one or more initiators. Examples of suitable pendent crosslinkable groups that may be activated by one or more initiators include, but are not limited to, allyl groups, acrylamide groups, and acrylate groups. In certain embodiments, the polymer comprises at least one type of repeat unit comprising a pendent crosslinkable group that may be activated by one or more initiators. In certain embodiments, the polymer comprises at least two types of repeat units comprising a pendent crosslinkable group that may be activated by one or more initiators. In some embodiments, the polymer comprises poly(N,N-dimethylacrylamide) (PDMA), poly(N-isopropylacrylamide) (PNIPAM), and/or poly(ethylene glycol diacrylate) (PEGDA). In some embodiments, the polymer is a copolymer comprising poly(N,N-dimethylacrylamide) (PDMA), poly(N-isopropylacrylamide) (PNIPAM), and/or poly(ethylene glycol diacrylate) (PEGDA). Non-limiting examples of suitable copolymers include PDMA-co-P(EGDA and PNIPAM-co-P(EGDA). An exemplary structure of PDMA-co-P(EGDA) is shown in FIG. 6A, and an exemplary structure of PNIPAM-co-P(EGDA) is shown in FIG. 6B.

Figure 7:
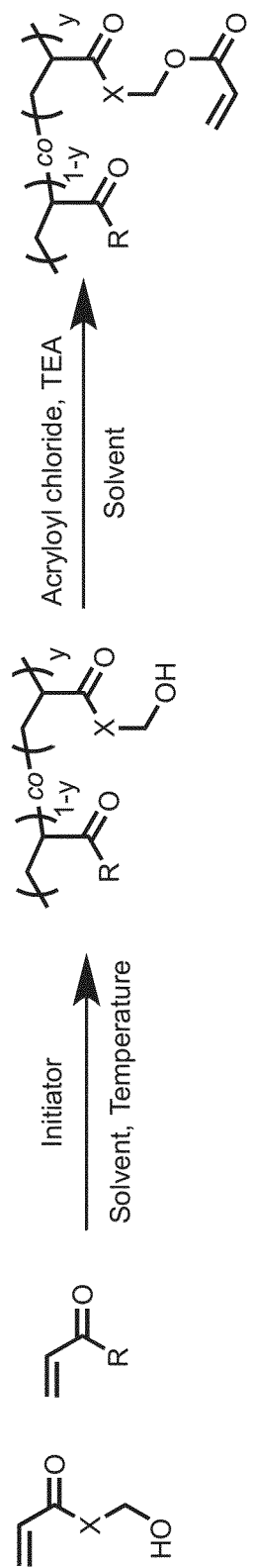
FIG. 7 shows an exemplary reaction scheme for forming a copolymer with pendent acrylate groups, according to some embodiments.
Figure 8A:
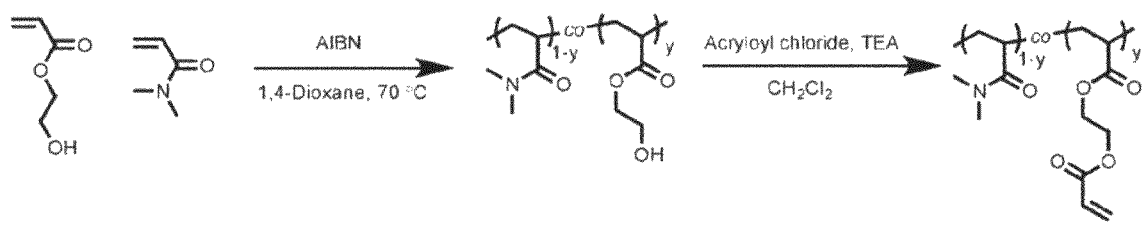
FIG. 8A shows, according to some embodiments, an exemplary reaction scheme for forming a PDMA copolymer containing pendent acrylate groups by conventional radical polymerization of DMA and 2-hydroxyethylacrylate (HEA) followed by post-polymerization modification to form poly(N,N-dimethylacrylamide)-co-poly(ethylene glycol diacrylate) (PDMA-co-P(EGDA))
Figure 8B:
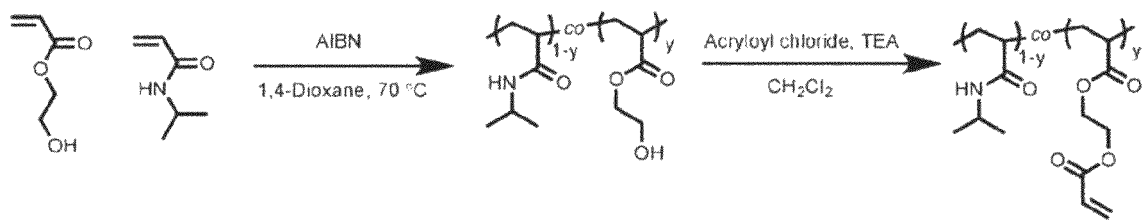
FIG. 8B shows, according to some embodiments, an exemplary reaction scheme for forming a PNIPAM copolymer containing pendent acrylate groups by conventional radical polymerization of NIPAM and 2-hydroxyethylacrylate (HEA) followed by post-polymerization modification to form poly(N-isopropylacrylamide)-co-poly(ethylene glycol diacrylate) (PNIPAM-co-P(EGDA))

In some embodiments, the copolymer comprising at least one type of repeat unit comprising a pendent crosslinkable group that may be activated by one or more initiators is formed through a polymerization reaction and post-polymerization modification. For example, FIG. 7 displays, according to some embodiments, an exemplary generic reaction scheme for the formation of a copolymer comprising pendent acrylate groups. FIG. 8A shows an exemplary reaction scheme for the formation of PDMA-co-P(EGDA) comprising radical polymerization of N,N-dimethlacrylamide (DMA) and 2-hydroxyethylacrylate (HEA) followed by post-polymerization modification to form PDMA-co-P(EGDA). FIG. 8B shows an exemplary reaction scheme for the formation of PNIPAM-co-P(EGDA) comprising radical polymerization of N-isopropylacrylamide (NIPAM) and HEA followed by post-polymerization modification to form PNIPAM-co-P(EGDA).

Figure 9A:
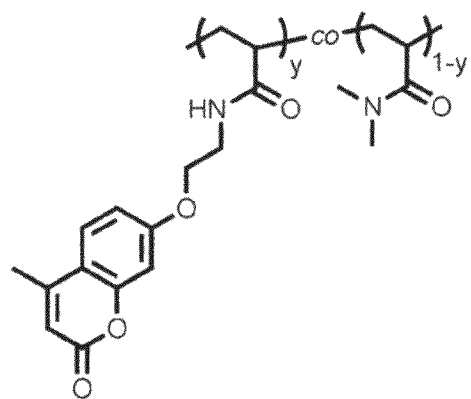
FIG. 9A shows, according to some embodiments, an exemplary structure for a copolymer of DMA with 7-(2-acrylamidoethoxy)-4-methylcoumarin (CoumAAm) containing pendent coumarin groups.
Figure 9B:
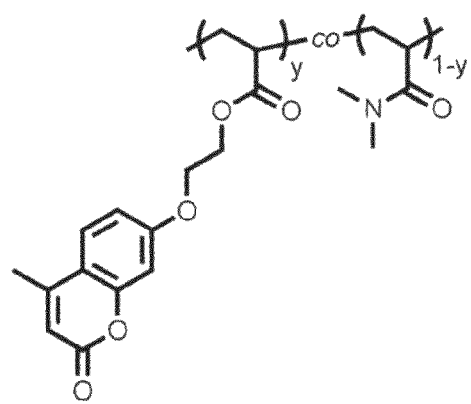
FIG. 9B shows, according to some embodiments, an exemplary structure for a copolymer of DMA with 7-(2-acryloyloxyethoxy)-4-methylcoumarin (CoumAc) containing pendent coumarin groups.
Figure 10:
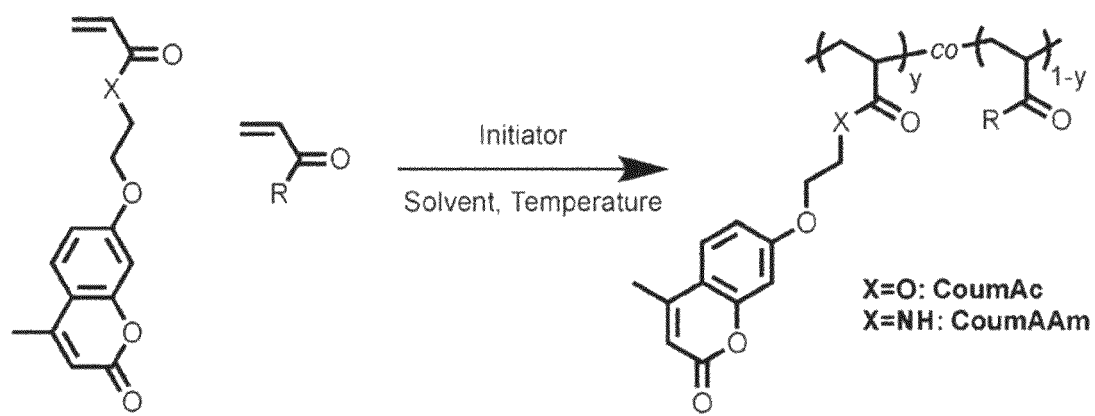
FIG. 10 shows an exemplary reaction scheme for forming a copolymer with pendent coumarin groups, according to some embodiments.
Figure 11A:
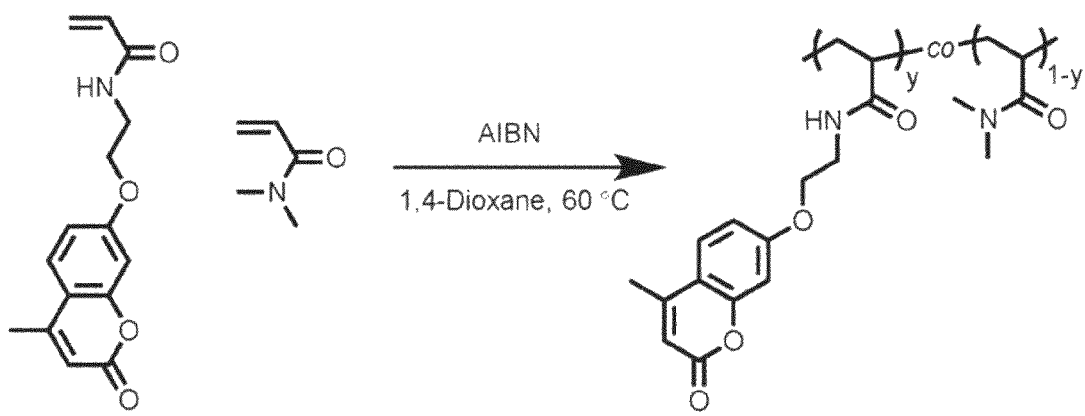
FIG. 11A shows an exemplary reaction scheme for forming copolymers of DMA and 7-(2-acrylamidoethoxy)-4-methylcoumarin (CoumAAm) through conventional radical polymerization, according to some embodiments.
Figure 11B:
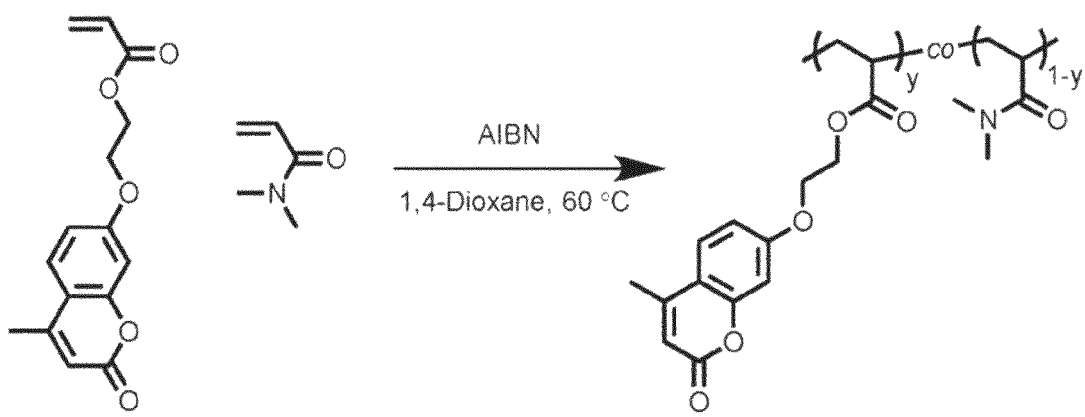
FIG. 11B shows an exemplary reaction scheme for forming copolymers of DMA and 7-(2-acryloyloxyethoxy)-4-methylcoumarin (CoumAc) through conventional radical polymerization, according to some embodiments.

In some embodiments, the polymer comprises one or more pendent crosslinkable groups that may be activated in the absence of an initiator. In certain cases, for example, these one or more pendent crosslinkable groups may be capable of photo-induced dimerization or reaction with another pendent crosslinkable group. Non-limiting examples of pendent crosslinkable groups that may be activated in the absence of an initiator include coumarin groups and pyrimidine bases (e.g., thymine, cytosine). In certain embodiments, the polymer comprises at least one type of repeat unit comprising a pendent crosslinkable group that may be activated in the absence of an initiator. In certain embodiments, the polymer comprises at least two types of repeat units comprising a pendent crosslinkable group that may be activated in the absence of an initiator. In some embodiments, the polymer comprises 7-(2-acrylamidoethoxy)-4-methylcoumarin (CoumAAm) and/or 7-(2-acryloyloxyethoxy)-4-methylcoumarin (CoumAc). In some embodiments, the polymer is a copolymer comprising CoumAAm and/or CoumAc. Non-limiting examples of suitable copolymers include PDMA-co-PCoumAAm and PDMA-co-PCoumAc. An exemplary structure of PDMA-co-PCoumAAm is shown in FIG. 9A, and an exemplary structure of PDMA-co-PCoumAc is shown in FIG. 9B. In some embodiments, the copolymer may be formed through radical polymerization. For example, FIG. 10 shows an exemplary generic scheme for forming a polymer with pendent coumarin groups. FIG. 11A displays an exemplary reaction scheme for the formation of PDMA-co-PCoumAAm, and FIG. 11B displays an exemplary reaction scheme for the formation of PDMA-co-PCoumAc, according to some embodiments.

In some cases, the polymer comprises one or more pendent crosslinkable groups that may be crosslinked by other methods. These methods include, but are not limited to, metal coordination, amidation, esterification, azide-alkyne cycloaddition, pericyclic reaction (e.g., Diels-Alder reaction), and nucleophilic substitution. Non-limiting examples of pendent crosslinkable groups amenable to the aforementioned crosslinking methods include carboxylic acids, esters, activated esters, alkynes, azides, dienes, dienophiles, alkyl halides, alcohols, and amines.

In some embodiments, the polymer comprising one or more pendent crosslinkable groups has a relatively high molecular weight. In some cases, it may be advantageous for the polymer to have a relatively high molecular weight to avoid diffusion of the polymer through the medium. In certain embodiments, the polymer has a number average molecular weight of at least about 500 g/mol, at least about 1000 g/mol, at least about 2000 g/mol, at least about 5000 g/mol, at least about 10,000 g/mol, at least about 20,000 g/mol, at least about 30,000 g/mol, at least about 40,000 g/mol, at least about 50,000 g/mol, at least about 60,000 g/mol, at least about 70,000 g/mol, at least about 80,000 g/mol, at least about 90,000 g/mol, at least about 100,000 g/mol, at least about 200,000 g/mol, at least about 300,000 g/mol, at least about 400,000 g/mol, or at least about 500,000 g/mol. In some embodiments, the polymer comprising one or more dormant functional groups has a number average molecular weight in the range of about 500 g/mol to about 5000 g/mol, about 500 g/mol to about 10,000 g/mol, about 500 g/mol to about 20,000 g/mol, about 500 g/mol to about 30,000 g/mol, about 500 g/mol to about 40,000 g/mol, about 500 g/mol to about 50,000 g/mol, about 500 g/mol to about 60,000 g/mol, about 500 g/mol to about 70,000 g/mol, about 500 g/mol to about 80,000 g/mol, about 500 g/mol to about 90,000 g/mol, about 500 g/mol to about 100,000 g/mol, about 500 g/mol to about 200,000 g/mol, about 500 g/mol to about 300,000 g/mol, about 500 g/mol to about 400,000 g/mol, about 500 g/mol to about 500,000 g/mol, about 10,000 g/mol to about 20,000 g/mol, about 10,000 g/mol to about 30,000 g/mol, about 10,000 g/mol to about 40,000 g/mol, about 10,000 g/mol to about 50,000 g/mol, about 10,000 g/mol to about 60,000 g/mol, about 10,000 g/mol to about 70,000 g/mol, about 10,000 g/mol to about 80,000 g/mol, about 10,000 g/mol to about 90,000 g/mol, about 10,000 g/mol to about 100,000 g/mol, about 10,000 g/mol to about 200,000 g/mol, about 10,000 g/mol to about 300,000 g/mol, about 10,000 g/mol to about 400,000 g/mol, about 10,000 g/mol to about 500,000 g/mol, about 50,000 g/mol to about 100,000 g/mol, about 50,000 g/mol to about 200,000 g/mol, about 50,000 g/mol to about 300,000 g/mol, about 50,000 g/mol to about 400,000 g/mol, about 50,000 g/mol to about 500,000 g/mol, about 80,000 g/mol to about 100,000 g/mol, about 80,000 g/mol to about 200,000 g/mol, about 80,000 g/mol to about 300,000 g/mol, about 80,000 g/mol to about 400,000 g/mol, about 80,000 g/mol to about 500,000 g/mol, about 100,000 g/mol to about 200,000 g/mol, about 100,000 g/mol to about 300,000 g/mol, about 100,000 g/mol to about 400,000 g/mol, or about 100,000 g/mol to about 500,000 g/mol.

An initiator generally refers to a material that can produce radical species under certain conditions (e.g., exposure to light and/or heat). In some cases, the one or more initiators may comprise a photoinitiator, a thermal initiator, and/or a redox initiator. In certain embodiments, the initiator is an azo initiator. Non-limiting examples of suitable initiators include azobisisobutyronitrile (AIBN), 4,4'-azobis(4-cyanovaleric acid) (ACVA), an Irgacure® initiator (e.g., Irgacure® 2959), 2-hydroxy-4'-(2-hydroxyethoxy)-2-methylpropiophenone, 2,2'-azobis[2-(2-imidazolin-2-yl)propane] disulfate dihydrate (VA-046B), 2,2'-azobis[2-(2-imidazolin-2-yl)propane]dihydrochloride (VA-044), and 2,2-dimethoxy-2-phenyl-acetophenone (DMPA).

In some cases, the initiator is present in the composition, which can be injected into a medium. In some cases, however, the initiator is present in the medium. In some embodiments, the initiator is present in the composition and the medium. In certain embodiments, the initiator is incorporated in the medium prior to injection of the composition into the medium. In some embodiments, the initiator is added after the composition has been injected into the medium. In certain such cases, for example, the initiator is added after injection by permeating the entire medium. In other such cases, the initiator is locally added near the site of injection to permeate the composition. In some cases, the initiator may be covalently incorporated in a portion of the polymer (e.g., along the backbone).

Figure 4:
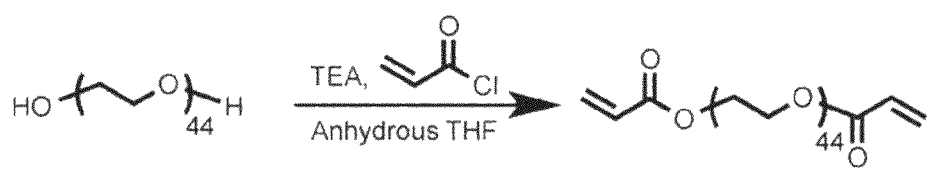
FIG. 4 shows, according to some embodiments, an exemplary reaction scheme for forming a PEG diacrylate crosslinker.

The crosslinker is typically a compound that can react with two or more polymer chains. In certain embodiments, for example, the crosslinker is a compound comprising at least two vinyl groups. In some embodiments, the crosslinker is a polymer. A non-limiting example of a suitable crosslinker is poly(ethylene glycol) diacrylate (PEGda). FIG. 4 shows, according to some embodiments, an exemplary reaction scheme for forming a PEGda crosslinker. In FIG. 4, a poly(ethylene glycol) is reacted with acryloyl chloride in the presence of triethylamine (TEA) in anhydrous tetrahydrofuran (THF) to form a PEGda crosslinker. The PEGda formed according to the reaction scheme of FIG. 4 may, in some cases, have a number average molecular weight of 2000 g/mol. In some cases, the crosslinker may be a polyol comprising two or more vinyl groups (e.g., acetylated poly(vinyl alcohol), acetylated sucrose).

In some embodiments, the crosslinker has a relatively high molecular weight. For example, it may be advantageous in certain cases for the crosslinker to have a relatively high molecular weight to avoid diffusion of the crosslinker through the medium. In some cases, the crosslinker has a number average molecular weight of at least about 500 g/mol, at least about 1000 g/mol, at least about 2000 g/mol, at least about 5000 g/mol, at least about 10,000 g/mol, at least about 20,000 g/mol, or at least about 50,000 g/mol. In some embodiments, the crosslinker has a number average molecular weight in the range of about 500 g/mol to about 1000 g/mol, about 500 g/mol to about 2000 g/mol, about 500 g/mol to about 5000 g/mol, about 500 g/mol to about 10,000 g/mol, about 500 g/mol to about 20,000 g/mol, about 500 g/mol to about 50,000 g/mol, about 1000 g/mol to about 5000 g/mol, about 1000 g/mol to about 10,000 g/mol, about 1000 g/mol to about 20,000 g/mol, about 1000 g/mol to about 50,000 g/mol, about 2000 g/mol to about 5000 g/mol, about 2000 g/mol to about 10,000 g/mol, about 2000 g/mol to about 20,000 g/mol, about 2000 g/ml to about 50,000 g/mol, about 5000 g/mol to about 10,000 g/mol, about 5000 g/mol to about 20,000 g/mol, about 5000 g/mol to about 50,000 g/mol, about 10,000 g/ml to about 20,000 g/mol, or about 10,000 g/mol to about 50,000 g/mol.

In some embodiments, the crosslinker has a relatively low molecular weight. In some embodiments, a crosslinker having a relatively low molecular weight can be mixed with the medium prior to injection of the composition and/or added near the site of injection after injection has occurred. In certain embodiments, the crosslinker has a number average molecular weight of about 500 g/mol or less, about 400 g/mol or less, about 300 g/mol or less, about 200 g/mol or less, or about 100 g/mol or less. In some embodiments, the crosslinker has a number average molecular weight in the range of about 100 g/mol to about 200 g/mol, about 100 g/mol to about 300 g/mol, about 100 g/mol to about 400 g/mol, or about 100 g/mol to about 500 g/mol.

In some cases, the crosslinker is present in the composition, which can be injected into a medium. In some cases, however, the crosslinker is present in the medium. In some embodiments, the crosslinker is present in the composition and the medium. In certain embodiments, the crosslinker is incorporated in the medium prior to injection of the composition into the medium. In some embodiments, the crosslinker is added after the composition has been injected into the medium. In certain such cases, for example, the crosslinker is added after injection by permeating the entire medium. In other such cases, the crosslinker is locally added near the site of injection to permeate the composition.

In some embodiments, the crosslinked polymer structure has a relatively high shear modulus. In some embodiments, the crosslinked polymer structure has an average shear modulus of at least about 1 MPa, at least about 10 MPa, at least about 50 MPa, at least about 100 MPa, at least about 500 MPa, at least about 1000 MPa, at least about 5000 MPa, or at least about 10,000 MPa. In some embodiments, the crosslinked polymer structure has an average shear modulus in the range of about 1 MPa to about 100 MPa, about 1 MPa to about 1000 MPa, about 1 MPa to about 10,000 MPa, about 100 MPa to about 1000 MPa, about 100 MPa to about 10,000 MPa, or about 1000 MPa to about 10,000 MPa. The average shear modulus of the crosslinked polymer structure can be measured using torsion tests according to ASTM D1043.

In some embodiments, the crosslinked polymer structure has a relatively high Young's modulus. In some embodiments, the crosslinked polymer structure has an average Young's modulus of at least about 500 MPa, at least about 1000 MPa, at least about 2000 MPa, at least about 3000 MPa, at least about 4000 MPa, at least about 5000 MPa, at least about 6000 MPa, at least about 7000 MPa, at least about 8000 MPa, at least about 9000 MPa, or at least about 10,000 MPa. In some embodiments, the crosslinked polymer structure has an average Young's modulus in the range of about 500 MPa to about 1000 MPa, about 500 MPa to about 2000 MPa, about 500 MPa to about 3000 MPa, about 500 MPa to about 4000 MPa, about 500 MPa to about 5000 MPa, about 500 MPa to about 6000 MPa, about 500 MPa to about 7000 MPa, about 500 MPa to about 8000 MPa, about 500 MPa to about 9000 MPa, about 500 MPa to about 10,000 MPa, about 1000 MPa to about 2000 MPa, about 1000 MPa to about 3000 MPa, about 1000 MPa to about 4000 MPa, about 1000 MPa to about 5000 MPa, about 1000 MPa to about 6000 MPa, about 1000 MPa to about 7000 MPa, about 1000 MPa to about 8000 MPa, about 1000 MPa to about 9000 MPa, about 1000 MPa to about 10,000 MPa, about 5000 MPa to about 6000 MPa, about 5000 MPa to about 7000 MPa, about 5000 MPa to about 8000 MPa, about 5000 MPa to about 9000 MPa, or about 5000 MPa to about 10,000 MPa. The average Young's modulus of the crosslinked polymer structure can be measured using tensile tests according to ASTM D575.

In some embodiments, a relatively high average shear modulus and/or a relatively high average Young's modulus may allow the crosslinked polymer structure to retain its shape after being removed from the medium, resulting in a three-dimensional freestanding crosslinked polymer structure. In some cases, for example, the crosslinked polymer structure may be removed from the medium by dissolving the medium in a solvent and/or gently agitating the medium.

In some embodiments, the concentration of the polymer in the composition is at least about 1 wt %, at least about 2 wt %, at least about 5 wt %, at least about 10 wt %, at least about 15 wt %, at least about 20 wt %, at least about 50 wt %, at least about 75 wt %, or about 100 wt %. In some embodiments, the concentration of the polymer in the composition is about 100 wt % or less, about 75 wt % or less, about 50 wt % or less, about 20 wt % or less, about 15 wt % or less, about 10 wt % or less, about 5 wt % or less, about 2 wt % or less, or about 1 wt % or less. In some embodiments, the concentration of the polymer in the composition is in the range of about 1 wt % to about 5 wt %, about 1 wt % to about 10 wt %, about 1 wt % to about 15 wt %, about 1 wt % to about 20 wt %, about 1 wt % to about 50 wt %, about 1 wt % to about 75 wt %, about 1 wt % to about 100 wt %, about 5 wt % to about 10 wt %, about 5 wt % to about 15 wt %, about 5 wt % to about 20 wt %, about 5 wt % to about 50 wt %, about 5 wt % to about 75 wt %, about 5 wt % to about 100 wt %, about 10 wt % to about 15 wt %, about 10 wt % to about 20 wt %, about 10 wt % to about 50 wt %, about 10 wt % to about 75 wt %, or about 10 wt % to about 100 wt %.

In some embodiments, the concentration of the crosslinker in the composition is at least about 0.1 wt %, at least about 0.2 wt %, at least about 0.5 wt %, at least about 1 wt %, at least about 2 wt %, at least about 5 wt %, at least about 10 wt %, at least about 15 wt %, at least about 20 wt %, or at least about 50 wt %. In some embodiments, the concentration of the crosslinker in the composition is about 50 wt % or less, about 20 wt % or less, about 15 wt % or less, about 10 wt % or less, about 5 wt % or less, about 2 wt % or less, about 1 wt % or less, about 0.5 wt % or less, about 0.2 wt % or less, or about 0.1 wt % or less. In some embodiments, the concentration of the crosslinker in the composition is in the range of about 0.1 wt % to about 1 wt %, about 0.1 wt % to about 5 wt %, about 0.1 wt % to about 10 wt %, about 0.1 wt % to about 15 wt %, about 0.1 wt % to about 20 wt %, about 0.1 wt % to about 50 wt %, about 1 wt % to about 5 wt %, about 1 wt % to about 10 wt %, about 1 wt % to about 15 wt %, about 1 wt % to about 20 wt %, about 1 wt % to about 50 wt %, about 5 wt % to about 10 wt %, about 5 wt % to about 15 wt %, about 5 wt % to about 20 wt %, about 5 wt % to about 50 wt %, about 10 wt % to about 15 wt %, about 10 wt % to about 20 wt %, or about 10 wt % to about 50 wt %. In some embodiments, the molar ratio of the crosslinker to the polymer is about 20:1 or less, about 15:1 or less, about 10:1 or less, about 9:1 or less, about 8:1 or less, about 7:1 or less, about 6:1 or less, about 5:1 or less, or about 1:1 or less. In some embodiments, the molar ratio of the crosslinker to the polymer is in the range of about 5:1 to about 10:1, about 5:1 to about 15:1, or about 5:1 to about 20:1. In some embodiments, the concentration of the initiator in the composition is at least about 0.01 wt %, at least about 0.05 wt %, at least about 0.1 wt %, at least about 0.5 wt %, at least about 1 wt %, at least about 2 wt %, or at least about 5 wt %. In some embodiment, the concentration of the initiator in the composition is about 5 wt % or less, about 2 wt % or less, about 1 wt % or less, about 0.5 wt % or less, about 0.1 wt % or less, about 0.05 wt % or less, or about 0.01 wt % or less. Combinations of these ranges are also possible. For example, the concentration of the initiator in the composition may be in the range of about 0.01 wt % to about 0.05 wt %, about 0.01 wt % to about 0.1 wt %, about 0.01 wt % to about 0.5 wt %, about 0.01 wt % to about 1 wt %, about 0.01 wt % to about 2 wt %, about 0.01 wt % to about 5 wt %, about 0.05 wt % to about 0.1 wt %, about 0.05 wt % to about 0.5 wt %, about 0.05 wt % to about 1 wt %, about 0.01 wt % to about 2 wt %, about 0.01 wt % to about 5 wt %, about 0.1 wt % to about 0.5 wt %, about 0.1 wt % to about 1 wt %, about 0.1 wt % to about 2 wt %, about 0.1 wt % to about 5 wt %, or about 1 wt % to about 5 wt %.

In some embodiments, the composition comprises about 1 wt % to about 50 wt % of the polymer, about 1 wt % to about 50 wt % of the crosslinker, and about 0.01 wt % to about 5 wt % of the initiator. In some embodiments, the composition comprises about 5 wt % to about 15 wt % of the polymer, about 5 wt % to about 15 wt % of the crosslinker, and about 0.01 wt % to about 1 wt % of the initiator.

In some embodiments, the composition comprises one or more additional components. For example, as noted above, in certain embodiments, the composition further comprises a metal catalyst. In some cases, if the polymer is formed through atom transfer radical polymerization, a metal catalyst (e.g., a transition metal complex) may be present in the composition. In some embodiments, however, the composition does not comprise a metal catalyst (i.e., the composition is substantially free of metal catalysts).

In some embodiments, the composition further comprises a solvent. Non-limiting examples of suitable solvents include benzene, toluene, xylene, tetrahydrofuran (THF), 1,4-dioxane, anisole, N,N-dimethylformamide (DMF), N,N-dimethyl acetamide (DMAC), dimethyl sulfoxide (DMSO), water, methanol, ethanol, and acetonitrile. In certain embodiments, the concentration of the solvent in the composition is about 0 wt %, at least about 1 wt %, at least about 2 wt %, at least about 5 wt %, at least about 10 wt %, at least about 15 wt %, at least about 20 wt %, at least about 50 wt %, or at least about 75 wt %. In some embodiments, the concentration of the solvent in the composition is about 75 wt % or less, about 50 wt % or less, about 20 wt % or less, about 15 wt % or less, about 10 wt % or less, about 5 wt % or less, about 2 wt % or less, about 1 wt % or less, or about 0 wt %. In some embodiments, the concentration of the solvent in the composition is in the range of about 0 wt % to about 5 wt %, about 0 wt % to about 10 wt %, about 0 wt % to about 15 wt %, about 0 wt % to about 20 wt %, about 0 wt % to about 50 wt %, or about 0 wt % to about 75 wt %.

The composition may be injected into any suitable medium. In some embodiments, the medium is a material that undergoes a temporary phase change in response to an applied stress (e.g., a "yield stress" material). For example, in some embodiments, the yield stress material is a solid or in some other phase in which the material retains its shape under an applied stress at a level below its yield stress. At an applied stress exceeding its yield stress, the material may become fluid or some other, more malleable phase in which the material can alter its shape. When the applied stress is removed, the yield stress material may become solid again. In some cases, there may be smooth variation between the solid (or solid-like) and fluid (or fluid-like) states.

In some cases, the yield stress material exhibits shear-thinning properties, characterized by viscosity reduction under shear strain and a return to an original solid-like state when the shear strain is removed. This transient flow property may enable one to shape the material via simple shearing. In some cases, the medium is thixotropic.

A yield stress material may thus provide a self-healing support structure into which complex structures of arbitrary design can be printed. A desired structure may therefore be printed without having to print support material as well. Instead, the phase-changed material may become the support material by conforming to the printed volume and reverting to a phase that constrains the volume. This approach may decrease costs and manufacturing time as compared to conventional 3D printing systems, for which the surface tension between the printed material and the support material generally plays a key role in limiting the minimum feature size that can be printed. The inventors have recognized and appreciated that substrates with complex geometries, such as tubes, toroids, spheres, cylinders, hierarchically branched vessel networks, high-aspect-ratio objects, and thin closed shells, may be challenging and time-consuming to fabricate with conventional methods, and that such substrates and structures with complex geometries may be printed more easily and more quickly using temporarily phase-changed materials.

Stress may be applied to the yield stress material in any suitable way. In certain embodiments, injecting the composition into the medium comprises causing a phase change in a region of the medium by applying focused energy to the region using a focused energy source, and displacing the medium with the composition. The energy may be in any suitable form, including, but not limited to, mechanical, electrical, radiant, or photonic energy. According to some embodiments, the stress may be provided via an injector, such as a syringe needle, shearing across the yield stress material (referred to as the outer fluid) and injecting an immiscible composition (referred to as the inner fluid). The stress may yield a small region of the outer fluid, which may re-solidify when the motion of the needle halts and may trap a droplet of the inner fluid. Droplets of complex topology, e.g., toroidal or crescent-shaped droplets, can be generated by rotating the continuous phase around a central axis while extruding the inner fluid from an injection needle positioned slightly off center. The dimensions of the torus may be controlled by (1) varying the amount of fluid injected and (2) changing the position of the needle with respect to the center of rotation. Note when combined with horizontal movement of the needle, spiral-shaped droplets can also be made.

In some cases, the yield stress material is particulate. For example, in some embodiments, the medium comprises a granular gel. The granular gel may, in some cases, comprise a plurality of polymeric particles (e.g., granules). In some cases, at least a portion of the polymeric particles comprise Carbopol®, Ashland™ carbomer, or other examples of lightly-crosslinked acrylic acid copolymers. In certain cases, the yield stress material may include dense packs of microgels (microscopic particles made from a swollen crosslinked polymer network). Microgels can, in some cases, be made from aqueous, hydrophilic polymers or from hydrophobic polymers such as PDMS. In some cases, microgels can be made from copolymers comprising lightly-crosslinked acrylic acid. Other yield stress materials include clay and dense nanofiber suspensions. In some embodiments, the yield stress material is a physically crosslinked gel.

In some embodiments, at least a portion of the particles have a maximum dimension of at least about 0.1 microns ($\mu$m), at least about 0.5 $\mu$m, at least about 1 $\mu$m, at least about 5 $\mu$m, at least about 10 $\mu$m, at least about 50 $\mu$m, or at least about 100 $\mu$m. In some embodiments, at least a portion of the particles have a maximum dimension of about 100 $\mu$m or less, about 50 $\mu$m or less, about 10 $\mu$m or less, about 5 $\mu$m or less, about 1 $\mu$m or less, about 0.5 $\mu$m or less, or about 0.1 $\mu$m or less. In some embodiments, the particles having an average maximum dimension in the range of about 0.1 $\mu$m and 1 $\mu$m, about 0.1 $\mu$m and 10 $\mu$m, or about 0.1 $\mu$m and 100 $\mu$m. As used herein, the "maximum dimension" of a particle refers to the longest distance between two opposed boundaries of an individual particle that can be measured (e.g., length, diameter). The "average maximum dimension" of a plurality of particles refers to the number average of the maximum dimensions of the particles. Accordingly, in some embodiments, the particles have a characteristic size on the micron or submicron scale.

The maximum dimensions of a plurality of particles can be measured using dynamic light scattering.

A yield stress material as described herein may have any suitable mechanical properties. For example, in some embodiments, a yield stress material may have an elastic modulus between approximately 1 Pa and 1000 Pa when in a solid phase or other phase in which the material retains its shape under applied stresses at levels below the yield stress. In some embodiments, the yield stress material may have an elastic modulus of at least about 1 Pa, at least about 5 Pa, at least about 10 Pa, at least about 50 Pa, at least about 100 Pa, at least about 500 Pa, or at least about 1000 Pa when in a solid (or solid-like) phase. In some embodiments, the yield stress material may have an elastic modulus in the range of about 1 Pa to about 1000 Pa, about 10 Pa to about 1000 Pa, about 100 Pa to about 1000 Pa, or about 500 Pa to about 1000 Pa. The elastic modulus of the yield stress material can be measured using tensile tests according to ASTM D575.

In some embodiments, the yield stress required to transform a yield stress material to a fluid-like phase may be between approximately 1 Pa and 1000 Pa. In some embodiments, the yield stress material has a yield stress of at least about 1 Pa, at least about 5 Pa, at least about 10 Pa, at least about 50 Pa, at least about 100 Pa, at least about 500 Pa, or at least about 1000 Pa. In some embodiments, the yield stress material has a yield stress of about 1000 Pa or less, about 500 Pa or less, about 100 Pa or less, about 50 Pa or less, about 10 Pa or less, or about 5 Pa or less. In some embodiments, the yield stress material has a yield stress in the range of about 1 Pa to about 10 Pa, about 1 Pa to about 100 Pa, about 1 Pa to about 500 Pa, about 1 Pa to about 1000 Pa, about 10 Pa to about 100 Pa, about 10 Pa to about 500 Pa, about 10 a to about 1000 Pa, about 100 Pa to about 1000 Pa, or about 500 Pa to about 1000 Pa. The yield stress of the yield stress material can be measured using a rotational rheometer.

When transformed to a fluid-like phase, a yield stress material may have a viscosity between approximately 1 Pas and 10,000 Pas. In some embodiments, the yield stress material has a viscosity of about 10,000 Pas or less, about 5,000 Pas or less, about 1,000 Pas or less, about 500 Pas or less, about 100 Pas or less, about 50 Pas or less, about 10 Pas or less, about 5 Pas or less, or about 1 Pas or less when in a fluid (or fluid-like) phase. In some embodiments, the yield stress material has a viscosity in the range of about 1 Pas to about 100 Pas, about 1 Pas to about 500 Pas, about 1 Pas to about 1,000 Pas, about 1 Pas to about 5,000 Pas, or about 1 Pas to about 10,000 Pas. The viscosity of the yield stress material can be measured using a differential viscometer according to ASTM D5225.

However, it should be understood that other values for the elastic modulus, yield stress, and/or viscosity of a yield stress material are also possible, as the present disclosure is not so limited.

Any suitable techniques may be used to deposit ink within the medium. For example, using a syringe, nozzle, or other suitable injection or placement device, the ink may be injected into one or more locations in the medium. Movement of the tip of a placement device through the medium may impart a sufficient amount of energy into a region around the tip to cause yielding such that the placement device may be easily moved to any location within the medium. In some instances, a pressure applied by the placement device to deposit ink within the medium may also be sufficient to cause yielding such that the medium flows to accommodate the ink. Movement of a placement device may be performed manually (e.g., "by hand"), or may performed by a machine or any other suitable mechanism.

Regardless of how the ink is placed in the medium, the yield stress of the medium be large enough to prevent yielding due to gravitational and/or diffusional forces exerted by the ink such that the position of the ink may remain substantially constant over time.

Depending on the particular embodiment, ink may be placed within a medium according to any suitable shape, geometry, and/or pattern. In some embodiments, ink may be arranged in shapes such as embryoid or organoid bodies, tubes, cylinders, toroids, hierarchically branched vessel networks, high aspect ratio objects, thin closed shells, or other complex shapes which may correspond to geometries of tissues, vessels or other biological structures.

According to some embodiments, a medium made from a yield stress material may enable 3D printing of a composition to form a desired pattern in three dimensions. For example, a computer-controlled injector tip may trace out a spatial path within a medium and inject the composition at locations along the path to form a desired 3D pattern or shape. Movement of the injector tip through the medium may impart sufficient mechanical energy to cause yielding in a region around the injector tip to allow the injector tip to easily move through the medium, and also to accommodate injection of the composition. After injection, the medium may transform back into a solid-like phase to support the composition and maintain the printed geometry. However, it should be understood that 3D printing techniques are not required to use a medium as described herein.

Embodiments may operate with any suitable interaction equipment, which may vary depending on the types of interactions to be performed, such as dispensing materials, removing materials, or other interactions. The interaction equipment may include syringes, pipettes, perfusion tubing, or other equipment. As another example, the chamber of the apparatus may include dispensers and outlets for adding or removing materials from the chamber/container, such as for adding or removing fluids. The equipment may include pumps or other equipment to inject or draw off fluids. The equipment may also include centrifuge equipment, to cause expulsion of fluids or other materials in the chamber. For example, the apparatus, the chamber of the apparatus, or the container in the chamber may, in some embodiments, be located within a centrifuge, which may be operated to spin the apparatus/chamber/container and cause materials therein to be expelled. In some embodiments that include pumps, centrifuges, or other equipment that may impose a force on the medium, the equipment may be operated such that a force imposed may be below the yield stress of the medium or below another force threshold. In addition, in some embodiments in which pumps, centrifuges, or other equipment is used to draw out material from the chamber, a filter-like membrane may separate the medium from an outflow of the container or chamber. The membrane may have a pore size or otherwise be arranged to prevent some content of the medium from exiting the container in which the medium is held.

The apparatus for injecting the composition into a medium (e.g., a yield stress medium) may include equipment for depositing a composition at particular locations within the medium to construct a three-dimensional structure.

Figure 5:
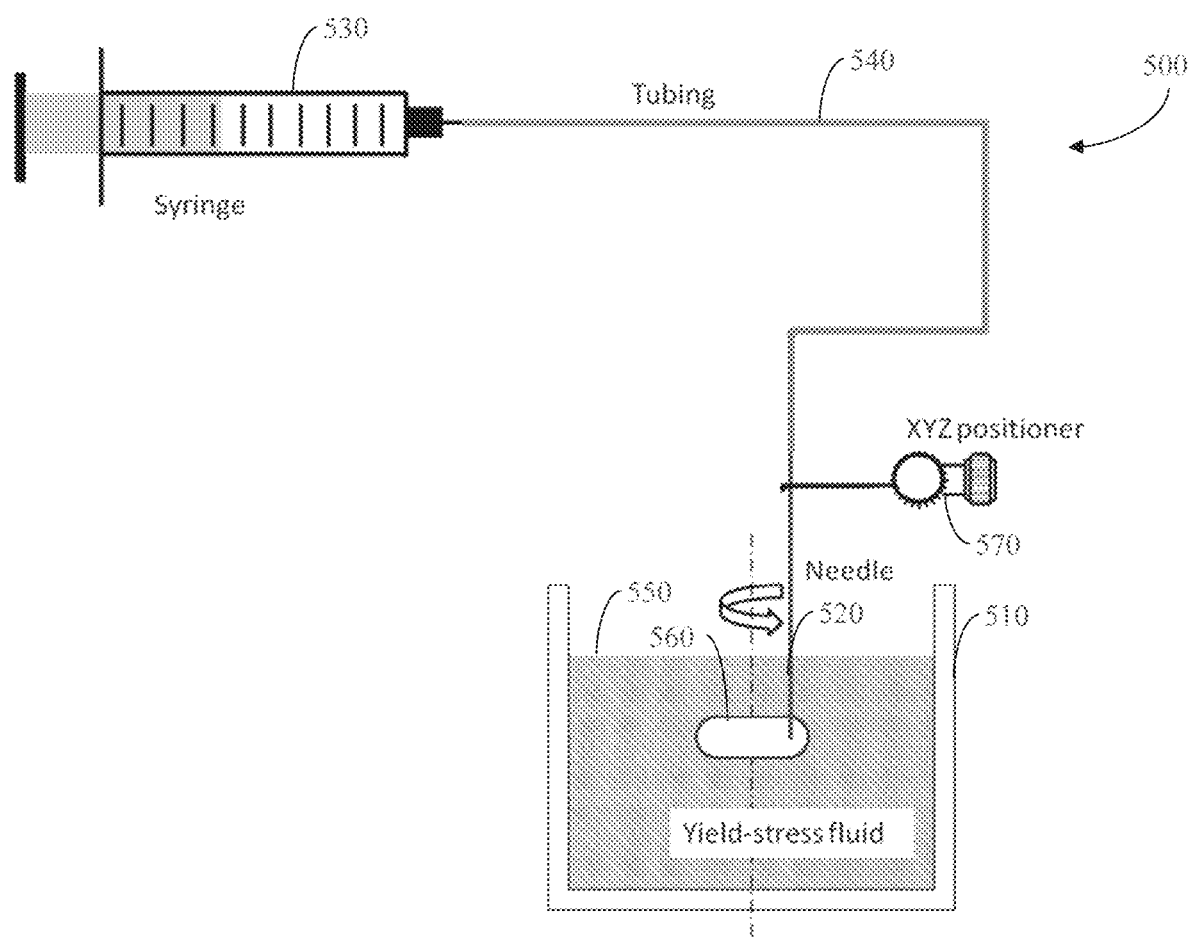
FIG. 5 shows an exemplary schematic illustration of a device for three-dimensional printing, according to some embodiments.

FIG. 5 shows a schematic illustration of an exemplary apparatus for 3D printing. In FIG. 5, apparatus 500 comprises a container 510, a needle 520, a syringe 530, and tubing 540. Container 510 may hold a first material 550, which may be a yield stress medium. Needle 520 may displace first material 550 with a second material 560, which may comprise a polymer with one or more dormant functional groups and/or a polymer comprising one or more pendent crosslinkable groups. Tubing 540 may be connected to an output of syringe 530 and an input of needle 520. Syringe 530 may include an amount of second material 560, which it may inject via tubing 540 and needle 520 into first material 550.

According to some embodiments, apparatus 500 may include a platform (not shown) that may cause relative displacement between first material 550 and needle 520. Additionally, the relative displacement between first material 550 and needle 520 may comprise relative rotation between first material 550 and needle 520, as shown in FIG. 5. This relative rotation between first material 550 and needle 520 may comprise rotation about an axis of first material 550, also shown in FIG. 5. According to some embodiments, the platform may cause the relative displacement between container 510 and needle 520 at a displacement rate faster than a characteristic breakup time of a jet of the second material 560.

According to some embodiments, apparatus 500 may further include a positioner or actuator 570. Positioner 570 may cause relative displacement between needle 520 and first material 550. For example, positioner 570 may position needle 520 three-dimensionally so that second material 560 enters first material 550 at the desired locations. Positioner 570 may also be used in conjunction with the platform to create specific shapes as the platform and positioner 570 each cause displacement simultaneously. For example, the platform may cause relative rotation between first material 550 and needle 520 while positioner 570 may displace needle 520 up and down, side to side, back and forth, and so on, creating any shape desired. Alternatively or additionally, the motion of needle 520 may be synchronized with the motion of positioner 570.

The 3D printing apparatus of some embodiments may include a 3D extrusion system for depositing a composition in a medium that is a yield stress material. The extrusion system may be constructed from three linear translation stages (M-403, Physik Instrumente) driven by Mercury DC motor controllers (C-863, Physik Instrumente). The extrusion system may include a computer-controlled syringe pump (Next Advance), held stationary to enable imaging as the stage moves, translating the yield stress support material in 3D. The extrusion nozzles may include glass pipettes, pulled with a Kopf-750 micropipette puller and shaped with a Narishige micro-forge. The apparatus may include nozzles having various diameters and shapes. Nozzle wettability may be varied automatically and/or manually with hydrophilic 3-aminopropyl-triethoxysilane, or hydrophobic octadecyltriethoxysiloxane.

Techniques as described herein may be implemented on any suitable hardware, including a programmed computing system. For example, analysis of a scan and construction of a model may be performed by programming a computing device. Similarly, control of a 3D printing device to print a composition in accordance with a model may be controlled by a programmed computing device.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments or cloud-based computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

EXAMPLE 1

This example describes a composition comprising a polymer, a crosslinker, and an initiator. Initially, poly(N,N-dimethylacrylamide) (PDMA) polymer chains with 2-dodecylthiocarbonothioylthio-2-methylpropionic acid moieties at each terminal end were formed via RAFT polymerization according to the reaction scheme shown in FIG. 2A. The difunctional PDMA that was obtained had a number average molecular weight of 48.8 kg/mol. A composition comprising 10 wt % difunctional PDMA, 8 wt % PEGda, and 0.05 wt % Irgacure was then formed, with PEGda being a crosslinker and Irgacure being a photoinitiator. Initially, the difunctional PDMA of the composition was uncrosslinked. However, upon exposure to ultraviolet (UV) radiation, the difunctional PDMA was crosslinked by the PEGda to form an end-linked hydrogel.

EXAMPLE 2

This example describes a composition comprising a polymer. Initially, PDMA copolymers with 1 mol % pendent CoumAAm moieties were formed via conventional radical polymerization according to the reaction scheme shown in FIG. 10A. The PDMA copolymer that was obtained had a number average molecular weight of 100.0 kg/mol. A composition comprising 30 wt % PDMA-co-PCoumAAm in water was then formed.

Initially, the PDMA copolymer was uncrosslinked. However, upon exposure to UV radiation, the PDMA was crosslinked by photodimerization of the pendent coumarin groups to form a crosslinked hydrogel.

EXAMPLE 3

This example describes a composition comprising a polymer. Initially, PDMA copolymers with 5 mol % pendent CoumAAm moieties were formed via conventional radical polymerization according to the reaction scheme shown in FIG. 10A. The PDMA copolymer that was obtained had a number average molecular weight of 90.5 kg/mol. A composition comprising 10 wt % PDMA-co-PCoumAAm in water was then formed. Initially, the PDMA copolymer was uncrosslinked. However, upon exposure to UV radiation, the PDMA was crosslinked by photodimerization of the pendent coumarin groups to form a crosslinked hydrogel.

EXAMPLE 4

This example describes a composition comprising a polymer. Initially, PDMA copolymers with 1 mol % pendent CoumAc moieties were formed via conventional radical polymerization according to the reaction scheme shown in FIG. 10B. The PDMA copolymer that was obtained had a number average molecular weight of 105.0 kg/mol. A composition comprising 20 wt % PDMA-co-PCoumAAm in water was then formed.

Initially, the PDMA copolymer was uncrosslinked. However, upon exposure to UV radiation, the PDMA was crosslinked by photodimerization of the pendent coumarin groups to form a crosslinked hydrogel.

EXAMPLE 5

This example describes a composition comprising a polymer. Initially, PDMA copolymers with 5 mol % pendent CoumAc moieties were formed via conventional radical polymerization according to the reaction scheme shown in FIG. 10B. The PDMA copolymer that was obtained had a number average molecular weight of 156.2 kg/mol. A composition comprising 10 wt % PDMA-co-PCoumAAm in water was then formed. Initially, the PDMA copolymer was uncrosslinked. However, upon exposure to UV radiation, the PDMA was crosslinked by photodimerization of the pendent coumarin groups to form a crosslinked hydrogel.

EXAMPLE 6

This example describes a composition comprising a polymer and an initiator. Initially, PDMA copolymers with 5 mol % pendent acrylate moieties were formed via conventional radical polymerization and post-polymerization modification according to the reaction scheme shown in FIG. 7A. The PDMA copolymer that was obtained had a number average molecular weight of 47.0 kg/mol. A composition comprising 10 wt % PDMA-co-P(EGDA) and 0.05 wt % Irgacure in water was then formed, with Irgacure being a photoinitiator. Initially, the PDMA copolymer was uncrosslinked. However, upon exposure to UV radiation, the PDMA was crosslinked by polymerization of the pendent acrylate groups to form a crosslinked hydrogel.

EXAMPLE 7

This example describes a composition comprising a polymer and an initiator. Initially, PNIPAM copolymers with 5 mol % pendent acrylate moieties were formed via conventional radical polymerization and post-polymerization modification according to the reaction scheme shown in FIG. 7B. The PNIPAM copolymer that was obtained had a number average molecular weight of 72.9 kg/mol. A composition comprising 10 wt % PNIPAM-co-P(EGDA) and 0.05 wt % Irgacure in water was then formed, with Irgacure being a photoinitiator. Initially, the PNIPAM copolymer was uncrosslinked. However, upon exposure to UV radiation, the PNIPAM was crosslinked by polymerization of the pendent acrylate groups to form a crosslinked hydrogel.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for three-dimensional printing, comprising:
a composition comprising a polymer comprising one or more dormant functional groups, wherein the one or more dormant functional groups comprise a thiocarbonylthio group, an alkoxyamine group, a halogen, and/or a cobalt-carbon bond;
a medium comprising a yield stress material having a yield stress of less than 100 Pascals (Pa);
a crosslinker, wherein the crosslinker is present in the composition and/or the medium; and
an initiator, wherein the initiator is present in the composition and/or the medium.

2. The system of claim 1, wherein the polymer is formed by controlled radical polymerization.

3. The system of claim 2, wherein the polymer is formed by RAFT polymerization.

4. The system of claim 1, wherein the polymer comprises at least one repeat unit derived from at least one vinyl monomer.

5. The system of claim 4, wherein the at least one vinyl monomer comprises an alkylacrylate, a methacrylate, an acrylate, an alkylacrylamide, a methacrylamide, an acrylamide, and/or a styrene.

6. The system of claim 1, wherein the polymer has a number average molecular weight in the range of about 1000 g/mol to about 100,000 g/mol.

7. The system of claim 1, wherein at least one of the one or more dormant functional groups is an end group.

8. The system of claim 7, wherein each of the one or more dormant functional groups is an end group.

9. The system of claim 1, wherein the polymer comprises two or more dormant functional groups comprising a thiocarbonylthio group, an alkoxyamine group, a halogen, and/or a cobalt-carbon bond.

10. The system of claim 1, wherein the polymer comprises difunctional poly(N-isopropylacrylamide) (PNIPAM), difunctional poly(N,N-dimethylacrylamide) (PDMA), and/or difunctional poly[poly(ethylene glycol) acrylate)] (PPEGA).

11. The system of claim 1, wherein the crosslinker comprises two or more vinyl groups.

12. The system of claim 1, wherein the crosslinker is poly(ethylene glycol) diacrylate or a polydimethylsiloxane (PDMS) macromonomer comprising two or more polymerizable groups.

13. The system of claim 12, wherein the two or more polymerizable groups comprise an acrylate group, a methacrylate group, an acrylamide group, and/or a methacrylamide group.

14. The system of claim 1, wherein the crosslinker has a number average molecular weight in the range of about 500 g/mol to about 50,000 g/mol.

15. The system of claim 1, wherein the initiator is a photoinitiator, a thermal initiator, or a redox initiator.

16. The system of claim 1, wherein the initiator is an azo initiator.

17. The system of claim 1, wherein the composition comprises an amount of the polymer in the range of 5 wt % to 20 wt %, an amount of the crosslinker in the range of 5 wt % to 20 wt %, and an amount of the initiator in the range of 0.01 wt % to 1 wt %.

18. The system of claim 1, wherein the polymer has a crosslinking density of 0 mol/cm$^3$ to $1\times10^{-3}$ mol/cm$^3$.

19. The system of claim 1, wherein the polymer has a glass transition temperature of 0° C. to 100° C.

20. A method of three-dimensional printing, comprising:
providing a system for three-dimensional printing, the system comprising:
a composition comprising a polymer comprising one or more dormant functional groups, wherein the one or more dormant functional groups comprise a thiocarbonylthio group, an alkoxyamine group, a halogen, and/or a cobalt-carbon bond;
a medium comprising a yield stress material having a yield stress of less than 100 Pascals (Pa);
a crosslinker, wherein the crosslinker is present in the composition and/or the medium; and
an initiator, wherein the initiator is present in the composition and/or the medium;
injecting the composition comprising the polymer into the medium; and
crosslinking the polymer to form a crosslinked polymeric structure.

21. A method of three-dimensional printing, comprising:
providing a system for three-dimensional printing, the system comprising:
a composition comprising a polymer comprising one or more dormant functional groups, wherein the one or more dormant functional groups comprise a thiocarbonylthio group, an alkoxyamine group, a halogen, and/or a cobalt-carbon bond;
a medium comprising a yield stress material having a yield stress of less than 100 Pascals (Pa);
a crosslinker, wherein the crosslinker is present in the composition and/or the medium; and
an initiator, wherein the initiator is present in the composition and/or the medium;
injecting the composition comprising the polymer into the medium, wherein the polymer further comprises one or more pendent crosslinkable groups; and
crosslinking the pendent crosslinkable groups of the polymer to form a crosslinked polymeric structure.

22. The method of claim 20, further comprising reacting a RAFT agent with at least one monomer to synthesize the polymer, wherein the RAFT agent comprises a dithioester, a dithiobenzoate, a dithiocarbamate, a trithiocarbonate, and/or a xanthate.

23. The method of claim 22, wherein the at least one monomer is a vinyl monomer.

24. The method of claim 23, wherein the vinyl monomer comprises an alkylacrylate, a methacrylate, an acrylate, an alkylacrylamide, a methacrylamide, an acrylamide, and/or a styrene.

25. The method of claim 20, wherein the polymer has a number average molecular weight in the range of about 1,000 g/mol to about 100,000 g/mol.

26. The method of claim 20, wherein at least one of the one or more dormant functional groups is an end group.

27. The method of claim 20, wherein each of the one or more dormant functional group is an end group.

28. The method of claim 20, wherein the polymer comprises difunctional poly (N-isopropylacrylamide) (PNI- PAM), difunctional poly(N,N-dimethylacrylamide) (PDMA), and/or difunctional poly[poly(ethylene glycol acrylate)](PPEGA).

29. The method of claim 20, wherein the composition further comprises a crosslinker.

30. The method of claim 20, wherein the medium comprises a crosslinker.

31. The method of claim 20, further comprising adding a crosslinker proximate the composition after the injecting step.

32. The method of claim 20, wherein the crosslinker comprises two or more vinyl groups.

33. The method of claim 20, wherein the crosslinker is poly(ethylene glycol) diacrylate or a polydimethylsiloxane (PDMS) macromonomer with two or more polymerizable groups.

34. The method of claim 33, wherein the two or more polymerizable groups comprise an acrylate group, a methacrylate group, an acrylamide group, and/or a methacrylamide group.

35. The method of claim 20, wherein the crosslinker has a number average molecular weight in the range of about 500 g/mol to about 50,000 g/mol.

36. The method of claim 20, wherein the initiator is a photoinitiator, a thermal initiator, or a redox initiator.

37. The method of claim 20, wherein the initiator is an azo initiator.

38. The method of claim 20, wherein the composition comprises an amount of the polymer in the range of 5 wt% to 20 wt%, an amount of the crosslinker in the range of 5 wt% to 20 wt%, and an amount of the initiator in the range of 0.01 wt% to 1 wt%.

39. The method of claim 20, wherein the polymer has a crosslinking density of at least about $1 \times 10^{-3}$ mol/cm$^3$ or less.

40. The method of claim 20, wherein the composition has a glass transition temperature of about 100 ° C. or less.

41. The method of claim 20, wherein the injecting step comprises:
   causing a phase change in a region of the medium by applying focused energy to the region using a focused energy source; and
   displacing the medium in the region with the composition.

42. The method of claim 20, wherein the crosslinking step comprises heating the composition and/or medium and/or exposing the composition and/or medium to electromagnetic radiation.

43. The method of claim 20, further comprising removing the crosslinked polymeric structure from the medium.

44. The method of claim 21, wherein the one or more pendent crosslinkable groups comprise an allyl group, an acrylamide group, and/or an acrylate group.

45. The method of claim 21, wherein the polymer is a copolymer comprising PDMA, PNIPAM, and/or P(EGDA).

46. The method of claim 21, wherein the polymer is PDMA-co-P(EGDA) or PNIPAM- co-P(EGDA).

47. The method of claim 21, wherein the one or more pendent crosslinkable groups comprise a coumarin group and/or a pyrimidine base.

48. The method of claim 21, wherein the polymer is a copolymer comprising PCoumAAm and/or PCoumAc.

49. The method of claim 21, wherein the polymer is PDMA-co-PCoumAAm or PDMA-co-PCoumAc.

50. The method of claim 21, wherein the one or more pendent crosslinkable groups comprise a carboxylic acid, an ester, an activated ester, an alkyne, an azide, a diene, a dienophile, an alkyl halide, an alcohol, and/or an amine.

51. The method of claim 21, wherein the polymer has a number average molecular weight of at least about 10,000 g/mol.

52. The method of claim 21, wherein the polymer has a number average molecular weight of at least about 80,000 g/mol.

53. The method of claim 21, wherein the polymer has a number average molecular weight of at least about 100,000 g/mol.

54. The method of claim 21, wherein the polymer has a number average molecular weight in the range of about 10,000 g/mol to about 500,000 g/mol.

55. The method of claim 21, wherein the initiator is a photoinitiator, a thermal initiator, or a redox initiator.

56. The method of claim 21, wherein the injecting step comprises:
   causing a phase change in a region of the medium by applying focused energy to the region using a focused energy source; and
   displacing the medium in the region with the composition.

57. The method of claim 21, wherein the crosslinking step comprises heating the composition and/or medium and/or exposing the composition and/or medium to electromagnetic radiation.

58. The method of claim 21, wherein the crosslinking step comprises exposing the composition to UV radiation.

59. The method of claim 21, further comprising removing the crosslinked polymeric structure from the medium.

* * * * *